US011129447B2

(12) United States Patent
Dyer et al.

(10) Patent No.: US 11,129,447 B2
(45) Date of Patent: Sep. 28, 2021

(54) DYNAMIC LACING SYSTEM WITH FEEDBACK MECHANISM

(71) Applicant: NIKE, Inc., Beaverton, OR (US)

(72) Inventors: Caleb W. Dyer, Beaverton, OR (US); Austin J. Orand, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 110 days.

(21) Appl. No.: 16/561,323

(22) Filed: Sep. 5, 2019

(65) Prior Publication Data

US 2020/0077748 A1 Mar. 12, 2020

Related U.S. Application Data

(60) Provisional application No. 62/727,916, filed on Sep. 6, 2018.

(51) Int. Cl.
| | |
|---|---|
| A43C 7/08 | (2006.01) |
| A43C 11/16 | (2006.01) |
| A43C 11/00 | (2006.01) |

(52) U.S. Cl.
CPC .............. *A43C 11/165* (2013.01); *A43C 7/08* (2013.01); *A43C 11/004* (2013.01)

(58) Field of Classification Search
CPC .......... A43C 11/16; A43C 11/165; A43C 7/08
USPC ........................................................ 36/50.1
See application file for complete search history.

(56) References Cited

U.S. PATENT DOCUMENTS

| | | | |
|---|---|---|---|
| 625,423 | A | 5/1899 | Scriven |
| 1,362,225 | A | 12/1920 | Carlslund |
| 1,964,406 | A | 6/1934 | Pellkofer |
| 2,072,785 | A | 3/1937 | Herman |
| 2,164,123 | A | 6/1939 | Rio |
| 2,200,895 | A | 5/1940 | Rio |
| 2,206,136 | A | 7/1940 | Tchetchet |

(Continued)

FOREIGN PATENT DOCUMENTS

| | | |
|---|---|---|
| CN | 1694630 A | 11/2005 |
| CN | 1817260 A | 8/2006 |

(Continued)

OTHER PUBLICATIONS

European Patent Office, Communication pursuant to Article 94(3) EPC for EP Application No. 19156091.1, dated Aug. 13, 2020.

(Continued)

*Primary Examiner* — Marie D Bays
(74) *Attorney, Agent, or Firm* — Honigman LLP; Matthew H. Szalach; Jonathan O'Brien

(57) ABSTRACT

An article of footwear comprises an upper defining an interior void, a sole structure attached to the upper, a cable attached to the upper and moveable in a tightening direction to decrease a volume of the interior void of the upper and in a loosening direction to increase a volume of the interior void of the upper, and a locking device operable between a locked state to prevent movement of the cable and an unlocked state to permit movement of the cable, the locking having a housing attached to one of the upper and the sole structure and receiving the cable therethrough. The housing includes a pulley rotatably disposed therein, whereby the pulley is engaged by the cable and configured cooperate with the housing to provide audible or tactile feedback when the pulley is rotated by cable.

19 Claims, 17 Drawing Sheets

(56) References Cited

U.S. PATENT DOCUMENTS

| | | |
|---|---|---|
| 2,342,188 A | 2/1944 | Ghez et al. |
| 2,370,302 A | 2/1945 | Ghez et al. |
| 2,435,668 A | 2/1948 | Behringer |
| 2,470,200 A | 5/1949 | Wallach |
| 2,922,235 A | 1/1960 | Meltzer |
| 2,922,236 A | 1/1960 | Meltzer |
| 2,992,235 A | 7/1961 | Green et al. |
| 3,481,332 A | 12/1969 | Marcia |
| 3,793,749 A * | 2/1974 | Gertsch ............... A43B 5/0449 36/117.6 |
| 4,026,045 A | 5/1977 | Druss |
| 4,309,832 A | 1/1982 | Hunt |
| 4,331,152 A | 5/1982 | Bartoli et al. |
| 4,391,048 A | 7/1983 | Lutz |
| 4,430,810 A | 2/1984 | Bente |
| 4,562,651 A | 1/1986 | Frederick et al. |
| 4,648,159 A | 3/1987 | Dougherty |
| 4,654,985 A * | 4/1987 | Chalmers ............ A43B 3/0084 24/68 SK |
| 4,735,004 A * | 4/1988 | Dodge ................ A43B 5/0458 24/68 B |
| 4,878,269 A | 11/1989 | Anscher et al. |
| 4,922,631 A | 5/1990 | Anderie |
| 4,936,028 A | 6/1990 | Posacki |
| 4,937,952 A * | 7/1990 | Olivieri ............... A43C 11/16 36/118.9 |
| 4,937,953 A | 7/1990 | Walkhoff |
| 4,941,273 A | 7/1990 | Gross |
| 5,158,559 A * | 10/1992 | Pozzobon ........... A43B 5/0449 24/68 SK |
| 5,175,949 A | 1/1993 | Seidel |
| 5,243,776 A | 9/1993 | Zelinko |
| 5,454,140 A | 10/1995 | Murai |
| 5,511,325 A | 4/1996 | Hieblinger |
| 5,535,531 A | 7/1996 | Karabed et al. |
| 5,560,126 A | 10/1996 | Meschan et al. |
| 5,729,912 A | 3/1998 | Gutkowski et al. |
| 5,755,044 A | 5/1998 | Veylupek |
| 5,791,068 A | 8/1998 | Bernier et al. |
| 5,813,146 A | 9/1998 | Gutkowski et al. |
| 5,839,210 A | 11/1998 | Bernier et al. |
| 5,894,639 A | 4/1999 | Boden et al. |
| 5,934,599 A | 8/1999 | Hammerslag |
| 5,983,530 A | 11/1999 | Chou |
| 6,029,870 A | 2/2000 | Giacona, III |
| 6,032,387 A | 3/2000 | Johnson |
| 6,036,066 A | 3/2000 | Giacona, III |
| 6,052,921 A | 4/2000 | Oreck |
| 6,055,746 A | 5/2000 | Lyden et al. |
| 6,115,945 A | 9/2000 | Ellis, III |
| 6,185,798 B1 | 2/2001 | Ton |
| 6,202,953 B1 | 3/2001 | Hammerslag |
| 6,247,249 B1 | 6/2001 | Lindqvist |
| 6,263,593 B1 | 7/2001 | Pierce et al. |
| 6,289,558 B1 | 9/2001 | Hammerslag |
| 6,339,867 B1 | 1/2002 | Azam |
| 6,378,230 B1 | 4/2002 | Rotem et al. |
| 6,427,361 B1 | 8/2002 | Chou |
| 6,443,338 B1 | 9/2002 | Giacona, III |
| 6,467,194 B1 | 10/2002 | Johnson |
| 6,622,358 B1 | 9/2003 | Christy |
| 6,691,433 B2 | 2/2004 | Liu |
| 6,896,128 B1 | 5/2005 | Johnson |
| 6,990,755 B2 | 1/2006 | Hatfield et al. |
| 7,096,559 B2 | 8/2006 | Johnson |
| 7,103,994 B2 | 9/2006 | Johnson |
| 7,143,529 B2 | 12/2006 | Robinson, Jr. et al. |
| 7,159,340 B2 | 1/2007 | Borsoi |
| 7,171,767 B2 | 2/2007 | Hatfield et al. |
| 7,231,699 B2 | 6/2007 | Borsoi |
| 7,281,341 B2 | 10/2007 | Reagan et al. |
| 7,290,357 B2 | 11/2007 | McDonald et al. |
| 7,331,126 B2 | 2/2008 | Johnson |
| 7,347,012 B2 | 3/2008 | Clark et al. |
| 7,392,605 B2 | 7/2008 | Hatfield et al. |
| 7,510,538 B2 | 3/2009 | Wolter et al. |
| 7,513,068 B2 | 4/2009 | Fauver |
| 7,516,914 B2 | 4/2009 | Kovacevich et al. |
| 7,526,881 B2 | 5/2009 | Jones et al. |
| 7,540,100 B2 | 6/2009 | Pawlus et al. |
| 7,591,050 B2 | 9/2009 | Hammerslag |
| 7,607,241 B2 | 10/2009 | McDonald et al. |
| 7,648,404 B1 | 1/2010 | Martin |
| 7,661,205 B2 | 2/2010 | Johnson |
| 7,676,957 B2 | 3/2010 | Johnson |
| 7,721,468 B1 | 5/2010 | Johnson et al. |
| 7,752,774 B2 | 7/2010 | Ussher et al. |
| 7,818,899 B2 | 10/2010 | Dinndorf et al. |
| 7,841,106 B2 | 11/2010 | Farys |
| 7,946,007 B2 * | 5/2011 | Borsoi ................. F16G 11/106 24/712.5 |
| 8,087,188 B2 | 1/2012 | Labbe et al. |
| 8,468,657 B2 | 6/2013 | Soderberg et al. |
| 8,474,157 B2 | 7/2013 | Motawi et al. |
| 8,505,220 B2 | 8/2013 | James et al. |
| 8,641,220 B1 | 2/2014 | Lin |
| 8,774,443 B1 | 7/2014 | Anderson et al. |
| 8,776,400 B2 | 7/2014 | James et al. |
| 8,776,401 B2 | 7/2014 | James et al. |
| 8,782,926 B2 | 7/2014 | Kishino |
| 8,904,672 B1 | 12/2014 | Johnson |
| 8,904,673 B2 | 12/2014 | Johnson et al. |
| 9,101,181 B2 | 8/2015 | Soderberg et al. |
| 9,125,450 B2 | 9/2015 | Zhao et al. |
| 9,155,353 B2 | 10/2015 | James et al. |
| 9,179,729 B2 | 11/2015 | Cotterman et al. |
| 9,179,751 B2 | 11/2015 | Lei et al. |
| 9,357,807 B2 | 6/2016 | Berns et al. |
| 9,629,418 B2 | 4/2017 | Rushbrook et al. |
| 9,675,132 B2 | 6/2017 | Marshall et al. |
| 9,681,705 B2 | 6/2017 | Trudel et al. |
| 9,737,115 B2 | 8/2017 | Soderberg et al. |
| 2001/0025434 A1 | 10/2001 | Fellouhe |
| 2002/0095750 A1 | 7/2002 | Hammerslag |
| 2003/0034365 A1 | 2/2003 | Azam et al. |
| 2003/0041478 A1 | 3/2003 | Liu |
| 2003/0204938 A1 | 11/2003 | Hammerslag |
| 2004/0250388 A1 | 12/2004 | Martin |
| 2005/0198867 A1 | 9/2005 | Labbe |
| 2005/0210706 A1 | 9/2005 | Johnson |
| 2006/0000116 A1 | 1/2006 | Brewer |
| 2006/0117600 A1 | 6/2006 | Greene |
| 2006/0156584 A1 | 7/2006 | Johnson |
| 2007/0011912 A1 | 1/2007 | Clark et al. |
| 2007/0011914 A1 | 1/2007 | Keen et al. |
| 2007/0022575 A1 | 2/2007 | Takahashi |
| 2007/0186447 A1 | 8/2007 | Ramos |
| 2007/0240334 A1 | 10/2007 | Johnson |
| 2007/0250388 A1 | 10/2007 | Walker et al. |
| 2007/0256281 A1 | 11/2007 | Breuer |
| 2007/0266598 A1 | 11/2007 | Pawlus et al. |
| 2008/0086911 A1 * | 4/2008 | Labbe ................. A43C 11/165 36/50.1 |
| 2008/0168685 A1 | 7/2008 | Kim et al. |
| 2008/0216351 A1 | 9/2008 | Carroll et al. |
| 2008/0301919 A1 | 12/2008 | Ussher |
| 2009/0000150 A1 | 1/2009 | Wong |
| 2009/0100717 A1 | 4/2009 | Cabanis |
| 2010/0139057 A1 | 6/2010 | Soderberg |
| 2011/0030244 A1 | 2/2011 | Motawi et al. |
| 2011/0047816 A1 | 3/2011 | Nurse |
| 2011/0067211 A1 | 3/2011 | Huber et al. |
| 2012/0005865 A1 | 1/2012 | Boden |
| 2012/0291242 A1 | 11/2012 | Donnadieu |
| 2013/0104429 A1 | 5/2013 | Torres |
| 2013/0318820 A1 | 12/2013 | Kishino |
| 2014/0196313 A1 | 7/2014 | Hatfield et al. |
| 2014/0196316 A1 | 7/2014 | Follet |
| 2014/0259783 A1 | 9/2014 | Dinndorf |
| 2015/0076272 A1 | 3/2015 | Trudel et al. |
| 2015/0313318 A1 | 11/2015 | Gibb et al. |
| 2017/0215525 A1 * | 8/2017 | Labbe ................. A43C 7/08 |
| 2017/0265577 A1 | 9/2017 | Schneider |

(56) References Cited

U.S. PATENT DOCUMENTS

| | | | |
|---|---|---|---|
| 2017/0265579 A1 | 9/2017 | Schneider et al. | |
| 2017/0318908 A1 | 11/2017 | Wyatt et al. | |
| 2017/0332735 A1* | 11/2017 | Orand | A43C 11/16 |
| 2018/0020767 A1* | 1/2018 | Dyer | A43C 11/20 36/97 |
| 2018/0223567 A1 | 8/2018 | Hollis | |
| 2019/0343233 A1* | 11/2019 | Rankin | A43B 3/0078 |
| 2020/0268106 A1* | 8/2020 | Blanche | A43B 23/0275 |

FOREIGN PATENT DOCUMENTS

| | | |
|---|---|---|
| CN | 1826065 A | 8/2006 |
| CN | 201142965 Y | 11/2008 |
| CN | 101631480 A | 1/2010 |
| CN | 101784210 A | 7/2010 |
| CN | 103224169 A | 7/2013 |
| CN | 203676303 U | 7/2014 |
| CN | 104470394 B | 5/2016 |
| CN | 105722419 A | 6/2016 |
| CN | 207707397 U | 8/2018 |
| DE | 55619 C | 3/1891 |
| DE | 297864 C | 5/1917 |
| DE | 202010001717 U1 | 6/2010 |
| EP | 0089930 A1 | 9/1983 |
| EP | 0636812 A1 | 2/1995 |
| EP | 2524610 A1 | 11/2012 |
| EP | 3429398 A2 | 1/2019 |
| EP | 3501317 A1 | 6/2019 |
| FR | 2792506 A1 | 10/2000 |
| KR | 2016-0007592 A | 1/2016 |
| WO | WO-9947013 A1 | 9/1999 |
| WO | WO-2004082417 A1 | 9/2004 |
| WO | WO-2009071652 A1 | 6/2009 |
| WO | WO-2014036471 A2 | 3/2014 |
| WO | WO-2014059458 A1 | 4/2014 |
| WO | WO-2014203416 A1 | 12/2014 |
| WO | WO-2015039052 A2 | 3/2015 |
| WO | WO-2015042216 A1 | 3/2015 |
| WO | WO-2016/015161 A1 | 2/2016 |

OTHER PUBLICATIONS

China National Intellectual Property Administration, First Office Action for CN App. No. 201810517008.3, dated Jun. 24, 2020.
European Patent Office as ISA, International Search Report and Written Opinion for PCT Application No. PCT/US2019/049658, dated Nov. 18, 2019.
United States Patent and Trademark Office, Non-Final Office Action for U.S. Appl. No. 15/655,769, dated Oct. 17, 2019.
European Patent Office, Communication pursuant to Article 94(3) EPC for EP Application No. 17746322.1, dated Dec. 18, 2019.
European Patent Office (ISA), International Search Report and Written Opinion for Application No. PCT/US2011/026896, dated May 5, 2011.
China National Intellectual Property Administration, First Office Action for CN Application No. 201810516838.4, dated Apr. 20, 2020.
International Searching Authority, International Search Report and Written Opinion for International Application No. PCT/US2017/043189, dated Oct. 17, 2017.
United States Patent and Trademark Office, Office Action for U.S. Appl. No. 15/951,256, dated Jul. 19, 2018.
United States Patent and Trademark Office, Office Action for U.S. Appl. No. 15/913,342, dated Nov. 19, 2018.
United States Patent and Trademark Office, Office Action for U.S. Appl. No. 15/951,406, dated Oct. 25, 2018.
International Searching Authority, International Preliminary Report on Patentability for International Application No. PCT/US2017/043189, dated Jan. 31, 2019.
United States Patent and Trademark Office, Office Action for U.S. Appl. No. 15/951,256, dated Jan. 28, 2019.
United States Patent and Trademark Office, Office Action for U.S. Appl. No. 15/951,406, dated Mar. 28, 2019.
United States Patent and Trademark Office, Notice of Allowance for U.S. Appl. No. 15/946,951, dated Mar. 22, 2019.
United States Patent and Trademark Office, Notice of Allowance for U.S. Appl. No. 15/913,342, dated Mar. 21, 2019.
European Patent Office, Extended EP Search Report for EP Application No. 19154641.5, dated May 16, 2019.
European Patent Office, Extended EP Search Report for EP Application No. 19155271.0, dated May 16, 2019.
European Patent Office, Extended EP Search Report for EP Application No. 19157061.3, dated May 16, 2019.
European Patent Office, Extended EP Search Report for EP Application No. 19156091.1, dated May 16, 2019.
European Patent Office, Extended EP Search Report for EP Application No. 19156088.7, dated May 16, 2019.
European Patent Office, Extended EP Search Report for EP Application No. 19158429.1, dated May 16, 2019.
European Patent Office, Extended EP Search Report for EP Application No. 19157058.9, dated May 16, 2019.
China National Intellectual Property Office, Office Action for CN Application No. 20170607317.5, dated Oct. 23, 2019.
United States Patent and Trademark Office, Office Action for U.S. Appl. No. 15/946,951, dated Sep. 6, 2018.
China National Intellectual Property Office, Office Action for CN Application No. 201810516003.9, dated Apr. 8, 2020.
European Patent Office, Communication pursuant to Article 94(3) EPC for EP Application No. 19156088.7, dated Feb. 18, 2020.
European Patent Office, Communication pursuant to Article 94(3) EPC for EP Application No. 19154641.5, dated Feb. 14, 2020.
European Patent Office, Communication pursuant to Article 94(3) EPC for EP Application No. 19155271.0, dated Mar. 27, 2020.
European Patent Office, Communication pursuant to Article 94(3) EPC for EP Application No. 19156091.1, dated Mar. 10, 2020.
European Patent Office, Communication pursuant to Article 94(3) EPC for EP Application No. 19158429.1, dated Feb. 18, 2020.
European Patent Office, Communication pursuant to Article 94(3) EPC for EP Application No. 19157058.9, dated Feb. 18, 2020.
Korean Intellectual Property Office, Office Action for KR Application No. 10-2019-7004710, dated Mar. 10, 2020.
United States Patent and Trademark Office, Office Action for U.S. Appl. No. 15/655,769, dated Apr. 10, 2020.
European Patent Office, Communication pursuant to Article 94(3) EPC for EP Application No. 19154641.5, dated Jun. 25, 2020.
China National Intellectual Property Administration, The First Office Action and Search Report for CN Application No. 201810516986.6, dated Apr. 20, 2020.
China National Intellectual Property Administration, The First Office Action for CN Application No. 201810521041.3, dated May 28, 2020.
China National Intellectual Property Administration, The Second Office Action for CN Application No. 201710607317.5, dated May 21, 2020.
China National Intellectual Property Administration, The First Office Action and Search Report for CN Application No. 20181051370.8, dated May 18, 2020.

* cited by examiner

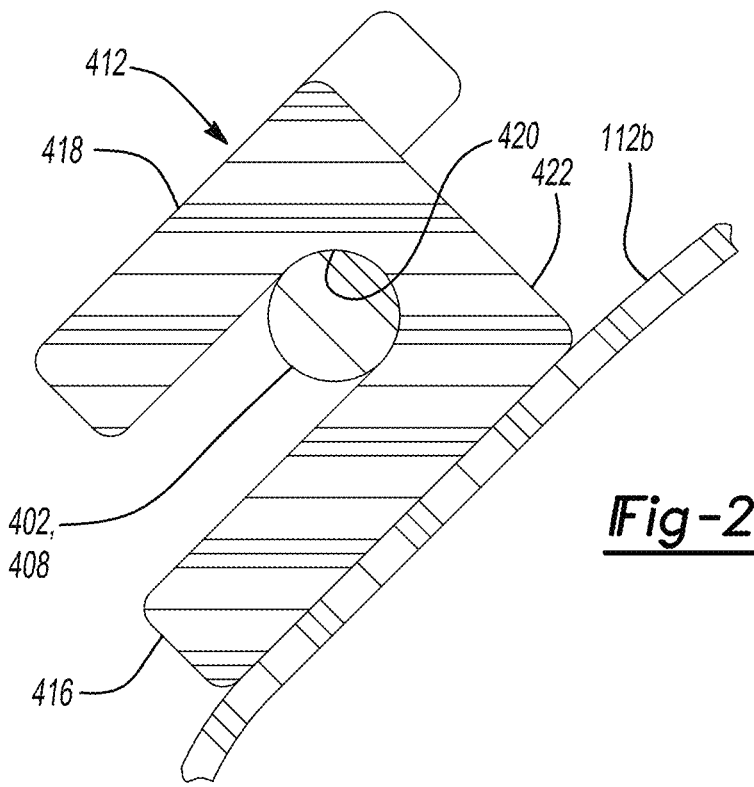
_Fig-2A_
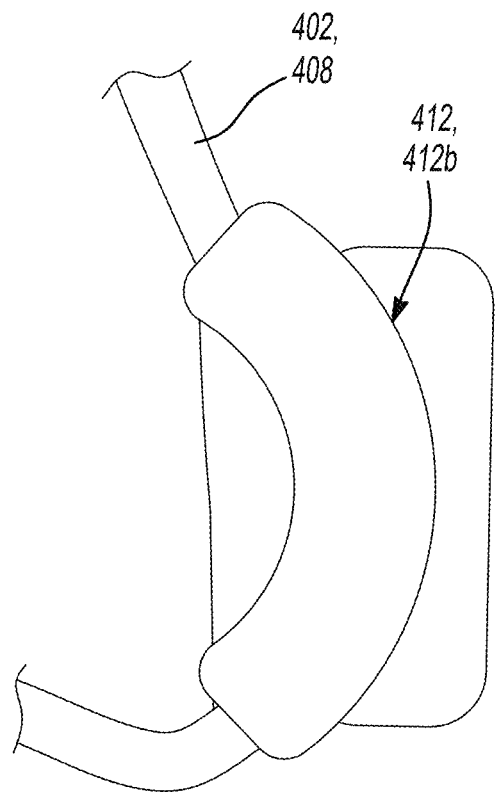
_Fig-2B_

DYNAMIC LACING SYSTEM WITH FEEDBACK MECHANISM

CROSS REFERENCE TO RELATED APPLICATIONS

This non-provisional U.S. patent application claims priority under 35 U.S.C. § 119(e) to U.S. Provisional Patent Application Ser. No. 62/727,916, filed Sep. 6, 2018, the disclosure of which is hereby incorporated by reference in its entirety.

FIELD

The present disclosure relates generally to articles of footwear having a dynamic lacing system for moving footwear between a tightened state and a loosened state.

BACKGROUND

This section provides background information related to the present disclosure which is not necessarily prior art.

Articles of footwear conventionally include an upper and a sole structure. The upper may be formed from any suitable material(s) to receive, secure and support a foot on the sole structure. A bottom portion of the upper, proximate to a bottom surface of the foot, attaches to the sole structure. Sole structures generally include a layered arrangement extending between an outsole providing abrasion-resistance and traction with a ground surface and a midsole disposed between the outsole and the upper for providing cushioning for the foot.

The upper may cooperate with laces, straps, or other fasteners to adjust the fit of the upper around the foot. For instance, laces may be tightened to close the upper around the foot and tied once a desired fit of the upper around the foot is attained. Care is required to ensure that the upper is not too loose or too tight around the foot each time the laces are tied. Moreover, the laces may loosen or become untied during wear of the footwear. While fasteners such as hook and loop fasteners are easier and quicker to operate than traditional laces, these fasteners have a propensity to wear out over time and require more attention to attain a desired tension when securing the upper to the foot.

Known tightening systems typically include a tightening mechanism, such as rotatable knob, that can be manipulated to apply tension to one or more cables that interact with the upper for closing the upper around that foot. While these tightening systems can incrementally increase the magnitude of tension of the one or more cables to achieve the desired fit of the upper around the foot, they require a time-consuming task of manipulating the tightening mechanism to properly tension the cables for securing the upper around the foot, and when it is desired to remove the footwear from the foot, the wearer is required to simultaneously depress a release mechanism and pull the upper away from the foot to release the tension of the cables. Thus, known tightening systems lack suitable provisions for both quickly adjusting the tension of the cables to close the upper around the foot and quickly release the tension applied to the cables so that the upper can be quickly loosened for removing the footwear from the foot. Moreover, the tightening mechanism employed by these known tightening systems is required to be incorporated onto an exterior of the upper so that the tightening mechanism is accessible to the wearer for adjusting the fit of the upper around the foot, thereby detracting from the general appearance and aesthetics of the footwear.

DRAWINGS

The drawings described herein are for illustrative purposes only of selected configurations and are not intended to limit the scope of the present disclosure.

FIG. 2A is a cross-sectional view of a cable guide according to the principles of the present disclosure, taken at section line 2A-2A of FIG. 2;

FIG. 2B is an enlarged view of a cable guide according to the principles of the present disclosure, taken at area 2B of FIG. 2;

Corresponding reference numerals indicate corresponding parts throughout the drawings.

DETAILED DESCRIPTION

Figure 1:
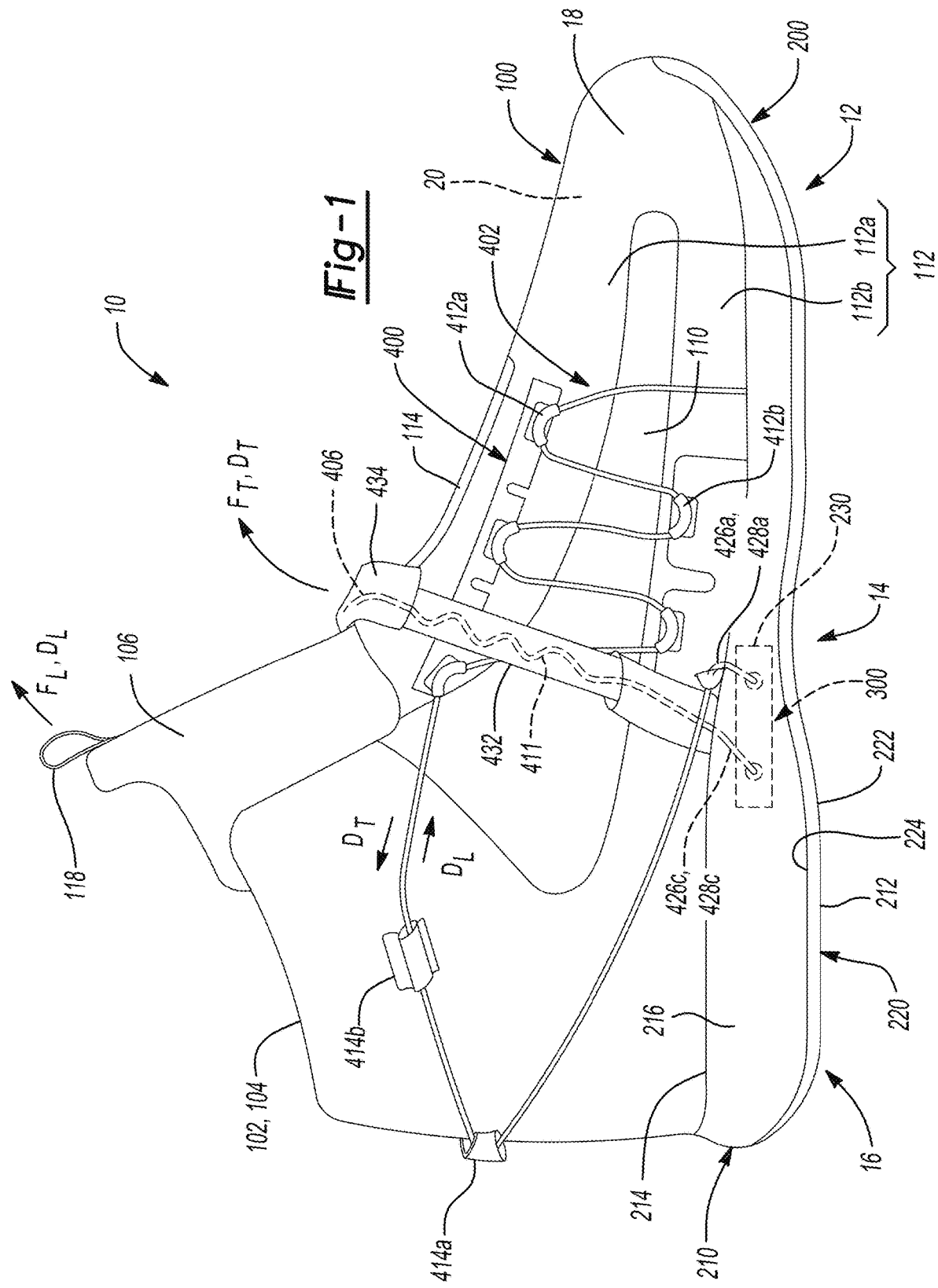
FIG. 1 is a side elevation view of an article of footwear having a locking device movable between a locked state to restrict movement of a cable and an unlocked state to permit movement of the cable in accordance with principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides an article of footwear. The article of footwear includes an upper defining an interior void and a cable movable in a tightening direction to move the upper into a tightened state and movable in a loosening direction to move the upper into a loosened state. The article of footwear also includes a cable lock coupled with the article of footwear and including a housing and operable in a locked state to restrict movement of the cable in the loosening direction and operable in an unlocked state to permit movement of the cable in the loosening direction. The cable lock includes a first pulley disposed within the housing and positioned to freely rotate in response to movement of the cable through the housing and along an outer circumferential portion of the first pulley.

Implementations of the disclosure may include one or more of the following optional features. In some implementations, the cable includes a control portion operable to be moved away from the upper in a first direction to move the cable in the tightening direction. Here, the cable lock may be disposed remotely from the control portion.

In some examples, the first pulley includes a plurality of protrusions extending from a rotational axis of the first pulley, the protrusions defining openings disposed between adjacent protrusions of the plurality of protrusions. The first pulley may define a groove extending around an outer circumference of the first pulley, the groove operable to receive the cable therein. Here, the groove may be defined between corresponding protrusions at each of a first side and an opposing second side of the first pulley. Optionally, the article of footwear may also include a prong coupled with the housing and having a first end operable to be intermittently engaged by the plurality of protrusions when the first pulley rotates. Here, the prong may include a second end attached to the housing, the first end moving relative to the second end when the first pulley rotates. The prong may be integrally formed with the housing. Additionally or alternatively, the prong may have a first length extending between the second end and the first end, the prong being flattened along a portion of the first length.

In some configurations, the cable lock includes a second pulley operable to provide at least one of audible feedback and tactile feedback when the cable is translated relative to and within the housing in the tightening direction, the second pulley engaging a different portion of the cable than the first pulley. Here, a biasing spring may extend between the first pulley and the second pulley, a first end of the biasing spring being coupled with the housing and a second end of the biasing spring being coupled with a sliding lock member. Additionally or alternatively, the housing may be elongate and may have a longitudinal midline, the first pulley may be disposed on an opposing side of the longitudinal midline of the housing relative to the second pulley, and both of the first pulley and the second pulley may be disposed adjacent a first end of the housing.

In some implementations, the housing has a first planar exterior surface and an opposing second planar exterior surface, a maximum thickness between the first planar exterior surface and the second planar exterior surface being within the range of 0.6 cm to 1.2 cm. The housing may be bilaterally symmetrical. Optionally, the housing may be shaped as a rounded rectangle. When the housing is shaped as a rounded rectangle, the article of footwear may further include an aperture located at each respective corner of the housing. Here, a portion of the cable may extend through each aperture located at each respective corner of the housing.

In some examples, the housing is rigid. In other examples, the housing includes one or more apertures located adjacent a peripheral edge of the housing and configured to receive insertion therethrough of a fastener. In this example, the fastener is one or more selected from the group consisting of a thread, a filament, a strap, a rivet, a bolt, a screw, a hook, and a rod.

In some configurations, the cable changes direction as it extends around a portion of the first pulley and extends through an aperture in the housing, and wherein the change in direction is greater than 35 degrees and less than 120 degrees. The article of footwear may also include a shaft extending from an inner surface of the housing, the first pulley being mounted on and rotatable about the shaft. The cable, when under tension, may extend from the first pulley at a tangent to the outer circumferential portion of the first pulley and through an aperture in the housing.

Another aspect of the disclosure provides an article of footwear. The article of footwear includes an upper defining an interior void. The article of footwear also includes a cable movable in a tightening direction to move the upper into a tightened state and movable in a loosening direction to move the upper into a loosened state. The article of footwear further includes a cable lock including a housing and operable in a locked state to restrict movement of the cable in the loosening direction and operable in an unlocked state to permit movement of the cable in the loosening direction. The cable lock includes a first pulley and a second pulley that receive different portions of the cable and are operable to rotate relative to the housing when the cable is translated relative to and within the housing.

Implementations of the disclosure may include one or more of the following optional features. In some examples, the cable includes a control portion operable to be moved away from the upper in a first direction to move the cable in the tightening direction. Here, the cable lock may be disposed remotely from the control portion. In another example, the first pulley and the second pulley are configured to provide an incremental feedback corresponding with movement of the cable by a first distance in the tightening direction.

In some implementations, at least one of the first pulley and the second pulley includes a plurality of protrusions extending from a rotational axis of the at least one of the first pulley and the second pulley, the protrusions defining openings disposed between adjacent protrusions of the plurality of protrusions. Here, the at least one of the first pulley and the second pulley may define a groove extending around an outer circumference of the at least one of the first pulley and the second pulley, the groove operable to receive the cable therein. Optionally, the article of footwear may include a prong having a first end operable to be intermittently engaged by the plurality of protrusions when the cable is moved in the tightening direction. Here, the prong may include a second end attached to the housing, the first end moving relative to the second end when the cable is moved in the tightening direction. The prong may be integrally formed with the housing. In some examples, the first pulley and the second pulley are operable to provide at least one of audible feedback and tactile feedback when the cable is translated relative to and within the housing in the tightening direction.

Another aspect of the disclosure provides a cable lock for a cable. The cable lock includes a housing having a first end and a second end disposed on an opposite end of the housing than the first end. The cable lock also includes a first pulley rotatably supported by the housing and disposed proximate to one of the first end and the second end. The first pulley is operable to freely rotate in response to movement of the cable through the housing and along an outer circumferential portion of the first pulley. The cable lock further includes a second pulley rotatably supported by the housing and disposed proximate to the one of the first end and the second end. The second pulley is operable to freely rotate in response to movement of the cable through the housing and along an outer circumferential portion of the second pulley. The cable lock also includes a lock member slidably disposed within the housing and movable between a locked state operable to restrict movement of the cable in a first direction relative to the housing and an unlocked state operable to permit movement of the cable in the first direction relative to the housing. The lock member is disposed closer to the other of the first end and the second end of the housing than the first pulley and the second pulley.

Implementations of the disclosure may include one or more of the following features. In some configurations, the first pulley and the second pulley each include a plurality of protrusions extending from a rotational axis of the first pulley and the second pulley, the protrusions defining openings disposed between adjacent protrusions of the plurality of protrusions. Here, the first pulley may define a first groove extending around an outer circumference of the first pulley and the second pulley may define a second groove extending around an outer circumference of the second pulley, the first groove and the second groove operable to receive the cable therein. Optionally, the first groove may be defined between corresponding protrusions at each of a first side and an opposing second side of the first pulley and the second groove may be defined between corresponding protrusions at each of a first side and an opposing second side of the second pulley. In this configuration, the cable lock may also include a first prong coupled with the housing and having a first end operable to be intermittently engaged by the plurality of protrusions when the first pulley rotates and a second prong coupled with the housing and having a first end operable to be intermittently engaged by the plurality of protrusions when the second pulley rotates. The first prong and the second prong each may include a second end attached to the housing, the first end elastically deflecting relative to the second end when the first pulley and the second pulley rotate. The first prong and the second prong may be integrally formed with the housing. Additionally or alternatively, the first prong and the second prong each may have a first length extending between the second end and the first end, the first prong and the second prong being flattened along a portion of the first length.

In some examples, either or both of the first pulley and the second pulley are operable to provide at least one of audible feedback and tactile feedback when rotated in response to the cable being translated relative to and within the housing, the second pulley engaging a different portion of the cable, or a different cable, than the first pulley. The cable lock may include a biasing spring that extends between the first pulley and the second pulley, a first end of the biasing spring being coupled with the housing and a second end of the biasing spring being coupled with a lock member.

In some implementations, the housing is elongate and has a longitudinal midline and the first pulley is disposed on an opposing side of the longitudinal midline of the housing relative to the second pulley. Optionally, the housing may have a first planar exterior surface and an opposing second planar exterior surface, a maximum thickness between the first planar exterior surface and the second planar exterior surface being within the range of 0.6 cm to 1.2 cm. Additionally or alternatively, the housing may be bilaterally symmetrical.

In some configurations, the housing is shaped as a rounded rectangle. Here, the cable lock may also include an aperture located at each respective corner of the housing. A portion of the cable may extend through each aperture located at each respective corner of the housing. Additionally or alternatively, the housing may be rigid. In other configurations, the housing includes one or more apertures located adjacent a peripheral edge of the housing and configured to receive insertion therethrough of a fastener. Here, the fastener may be one or more selected from the group consisting of a thread, a filament, a strap, a rivet, a bolt, a screw, a hook, and a rod.

In some examples, the cable changes direction as it extends around a portion of the first pulley and extends through a first aperture in the housing, and changes direction as it extends around a portion of the second pulley and extends through a second aperture in the housing, and wherein the change in direction is greater than 35 degrees and less than 120 degrees. The cable lock may include a first shaft extending from an inner surface of the housing and a second shaft extending from the inner surface of the housing, the first pulley being mounted on and rotatable about the first shaft and the second pulley being mounted on and rotatable about the second shaft.

In some implementations, the cable, when under tension, extends from the first pulley at a tangent to the outer circumferential portion of the first pulley and through a first aperture in the housing, and extends from the second pulley at a tangent to the outer circumferential portion of the second pulley and through a second aperture in the housing. In other implementations, the lock member includes a first lock surface and a second lock surface that converge toward one another, the first lock surface operable to pinch a first portion of the cable between a first engagement surface of the housing and the first lock surface in the locked state, and the second lock surface operable to pinch a second portion of the cable between a second engagement surface of the housing and the second lock surface, in the locked state to restrict movement of the cable in the first direction relative to the housing.

The details of one or more implementations of the disclosure are set forth in the accompanying drawings and the description below. Other aspects, features, and advantages will be apparent from the description and drawings, and from the claims.

Referring to FIGS. 1-18, in some implementations, an article of footwear 10 includes an upper 100 and a sole structure 200 attached to the upper 100. The article of footwear 10 further includes a locking device or cable lock 300 and a fastening system 400 integrated into at least one of the upper 100 and the sole structure 200. The fastening system 400 includes a cable 402 that cooperates with the locking device 300 to move the article of footwear 10 between a tightened state and a loosened state, as detailed below.

As described in greater detail below, the cable 402 is movable in a tightening direction $D_T$ to move the article of footwear 10 into the tightened state and movable in the loosening direction $D_L$ to move the article of footwear 10 into the loosened state. In some implementations, the upper 100 and the sole structure 200 cooperate to provide passages and guides for routing portions of the cable 402 through the locking device 300. The locking device 300 is configured to selectively secure the cable 402 in the tightened state.

The article of footwear 10 may be divided into one or more regions. The regions may include a forefoot region 12, a midfoot region 14 and a heel region 16. The forefoot region 12 may correspond with toes and joints connecting metatarsal bones with phalanx bones of a foot. The midfoot region 14 may correspond with an arch area of the foot, and the heel region 16 may correspond with rear regions of the foot, including a calcaneus bone. The footwear 10 may include lateral and medial sides 18, 20, respectively, corresponding with opposite sides of the footwear 10 and extending through the regions 12, 14, 16.

The upper 100 includes interior surfaces that define an interior void 102 configured to receive and secure a foot for support on the sole structure 200. An ankle opening 104 in the heel region 16 may provide access to the interior void 102. For example, the ankle opening 104 may receive a foot to secure the foot within the void 102 and facilitate entry and removal of the foot to and from the interior void 102. The upper 100 may include a tongue portion 106 that extends between the lateral side 18 and the medial side 20 and covers the interior void 102.

The upper 100 may be formed from one or more materials that are stitched or adhesively bonded together to form the interior void 102. Suitable materials of the upper may include, but are not limited to, textiles, foam, leather, and synthetic leather. The example upper 100 may be formed from a combination of one or more substantially inelastic or non-stretchable materials and one or more substantially elastic or stretchable materials disposed in different regions of the upper 100 to facilitate movement of the upper 100 between the tightened state and the loosened state.

The one or more elastic materials may include any combination of one or more elastic fabrics such as, without limitation, spandex, elastane, rubber or neoprene. The one or more inelastic materials may include any combination of one or more of thermoplastic polyurethanes, nylon, leather, vinyl, or another material/fabric that does not impart properties of elasticity. For example, one or both of the lateral side 18 and the medial side 20 of the upper 100 may include an elastic region 110 formed from the one or more elastic materials and an inelastic region 112 formed from the one or more inelastic materials. In the examples shown, the inelastic region 112 surrounds the elastic region 110. For instance, the inelastic region 112 may include an upper inelastic region 112a and a lower inelastic region 112b that bound upper and lower edges of the elastic region 110 extending from the forefoot region 12 to the midfoot region 14 at one or both of the lateral side 18 and the medial side.

Figure 2:
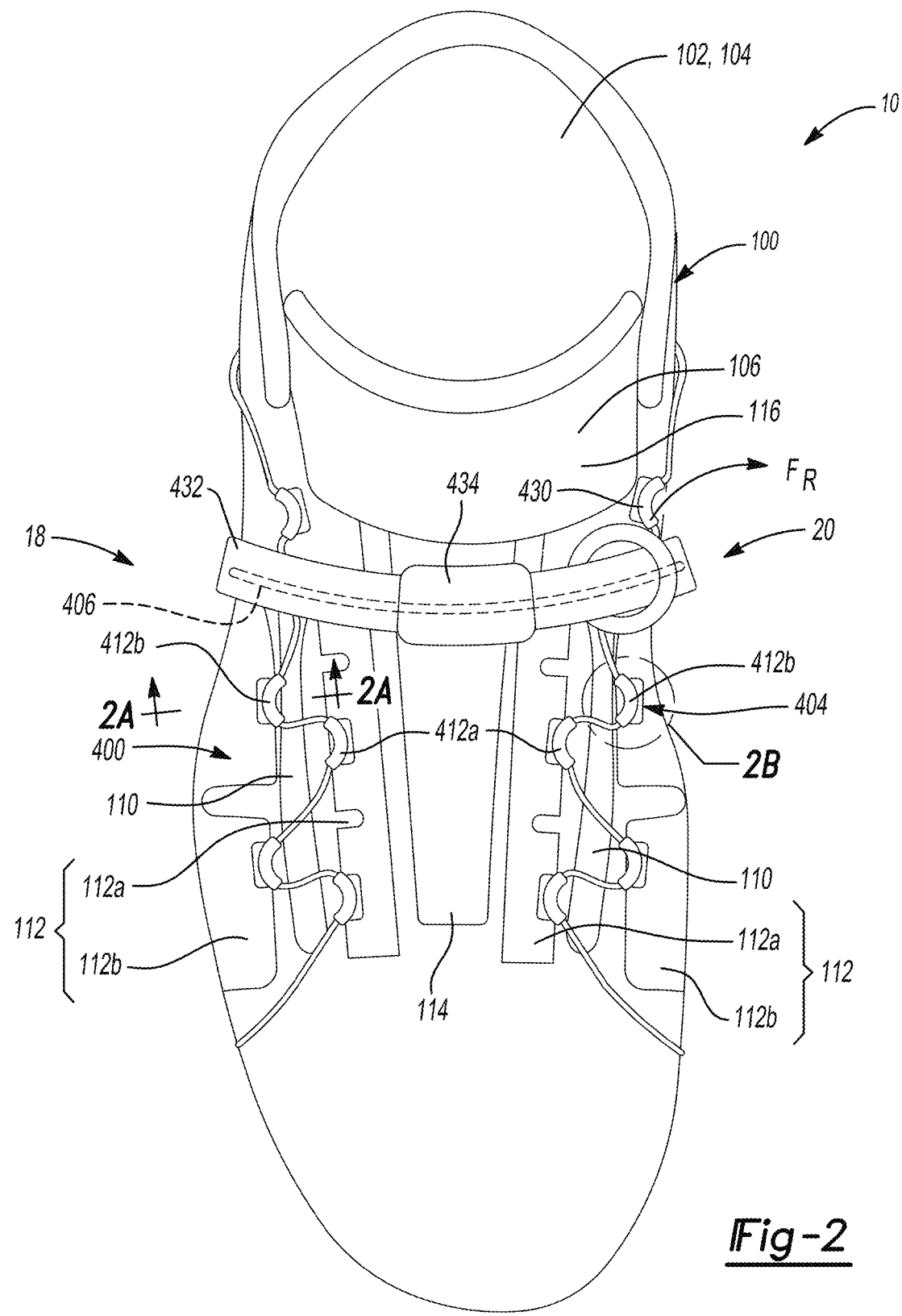
FIG. 2 is a top perspective view of the article of footwear of FIG. 1 showing a cable having lateral and medial lace segments operable to move the upper from a loosened state to a tightened state when the cable moves in a tightening direction.

In some configurations, an instep region 114 may be formed from the one or more elastic materials, and extends along the upper 100 from the tongue 106 through the forefoot region 12 between the respective upper inelastic regions 112a of the lateral side 18 and the medial side 20, as shown in FIG. 2. Accordingly, the elastic instep region 114 separates the lateral and medial sides 18 and 20 of the upper 100. In other configurations, the elastic instep region 114 is omitted and the inelastic lateral and medial upper inelastic regions 112a cooperate to cover the instep of the foot within the interior void 102. In some configurations, the entire upper 100 is formed from the one or more elastic materials and the one or more inelastic materials are attached (e.g., bonded or fastened) to the elastic material at predetermined locations to define localized inelastic regions.

FIG. 2 is a top view of the footwear 10 showing the upper 100 including a throat closure 116 corresponding to the instep region 114 and extending between the elastic regions 110 of the lateral side 18 and the medial side 20. In some examples, the throat closure 116 of the upper 100 integrally forms the tongue portion 106 from the one or more inelastic materials. Thus, the throat closure 116 may define a portion of the interior void 102 and enclose a foot therein when the upper 100 is in either one of the tightened state or the loosened state.

In some implementations, the sole structure 200 includes a midsole 210 and an outsole 220 arranged in a layered configuration. For example, the outsole 220 engages with a ground surface during use of the footwear 10 and the midsole 210 is disposed between the upper 100 and the outsole 220. In some examples, the sole structure 200 may also incorporate additional layers such as an insole or sockliner that may reside within the interior void 102 of the upper 100 to receive a plantar surface of the foot to enhance the comfort of the footwear 10.

Figure 3:
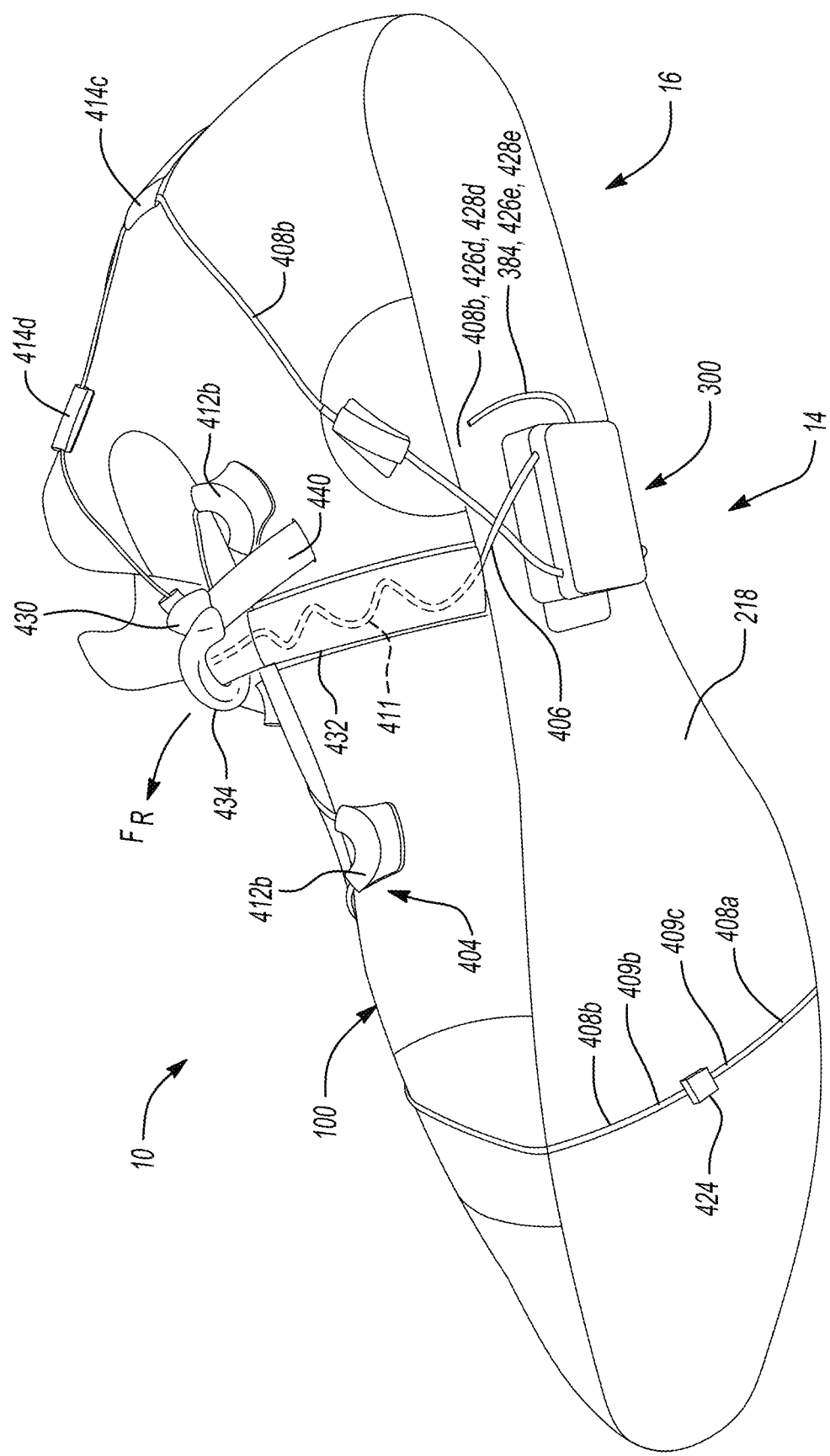
FIG. 3 is a bottom perspective view of the article of footwear of FIG. 1 showing a sole structure removed from an upper to expose the locking device disposed on a bottom surface of a Strobel.

The midsole 210 may include a bottom surface 212 and a top surface or footbed 214 disposed on an opposite side of the midsole 210 from the bottom surface 212. In some examples, a sidewall 216 of the midsole 210 extends between the lower surface 212 and the upper surface 214. Stitching or adhesives may secure the midsole 210 to the upper 100. In addition, the midsole 210 may be attached to a strobel 218 disposed generally between the upper 100 and the midsole 210, as shown in FIG. 3. The footbed 214 may be contoured to conform to a profile of the bottom surface (e.g., plantar) of the foot. In some examples, the insole or sockliner may be disposed on the footbed under the foot within at least a portion of the interior void 102 of the upper 100.

In some examples, the outsole 220 includes a ground-engaging surface 222 and an opposite inner surface 224. The outsole 220 may be attached to the upper 100 via the midsole 210. The outsole 220 generally provides abrasion resistance and traction with the ground surface, and may be formed from one or more materials that impart durability and wear resistance, as well as enhance traction with the ground surface. For example, rubber may form at least a portion of the outsole 220.

As shown in FIG. 1, the sole structure 200 may include a cavity 230 for encapsulating the locking device 300 as well as passages/channels formed through the midsole 210 for routing the cable 402 therethrough. In the example shown, the cavity 230 is formed through the footbed 214 and the bottom surface 212 of the midsole 210 such that the locking device 300 affixed to the strobel 218 resides in the cavity 230. Other configurations may include the cavity 230 formed into the footbed 214 without extending through the bottom surface 212. In some examples, the midsole 210 is neither bonded to the strobel 218 nor the inner surface 224 of the outsole 220, whereas the locking device 300 attaches/bonds to the bottom surface of the strobel 218.

As described in greater detail below, the upper 100 and the sole structure 200 may include a plurality of features and elements for integrating the locking device 300 into the article of footwear 10, allowing the locking device 300 to move the article of footwear 10 between a tightened state and a relaxed state.

Figure 8:
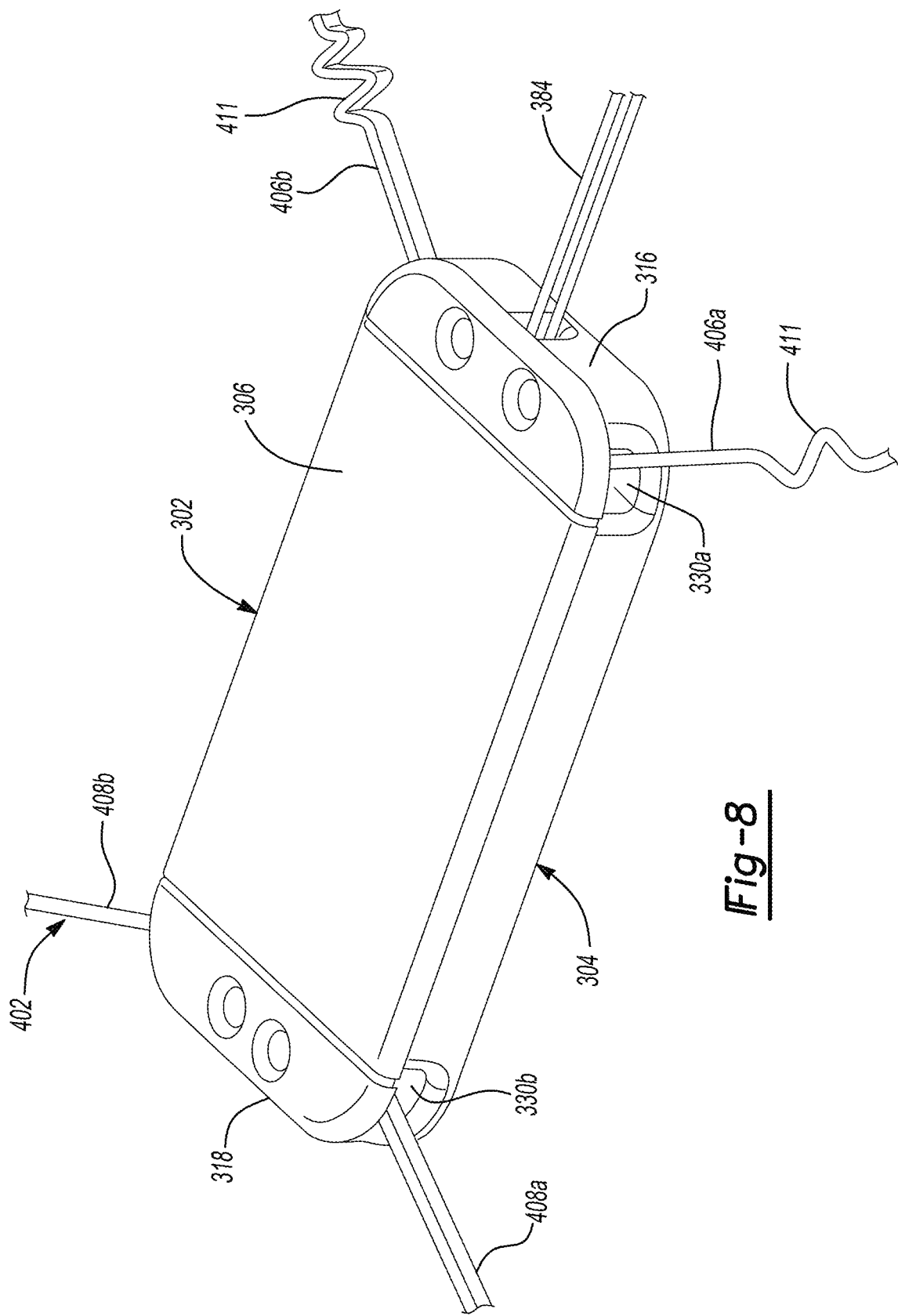
FIG. 8 is a perspective view of a locking device and cable according to the principles of the instant disclosure.
Figure 9:
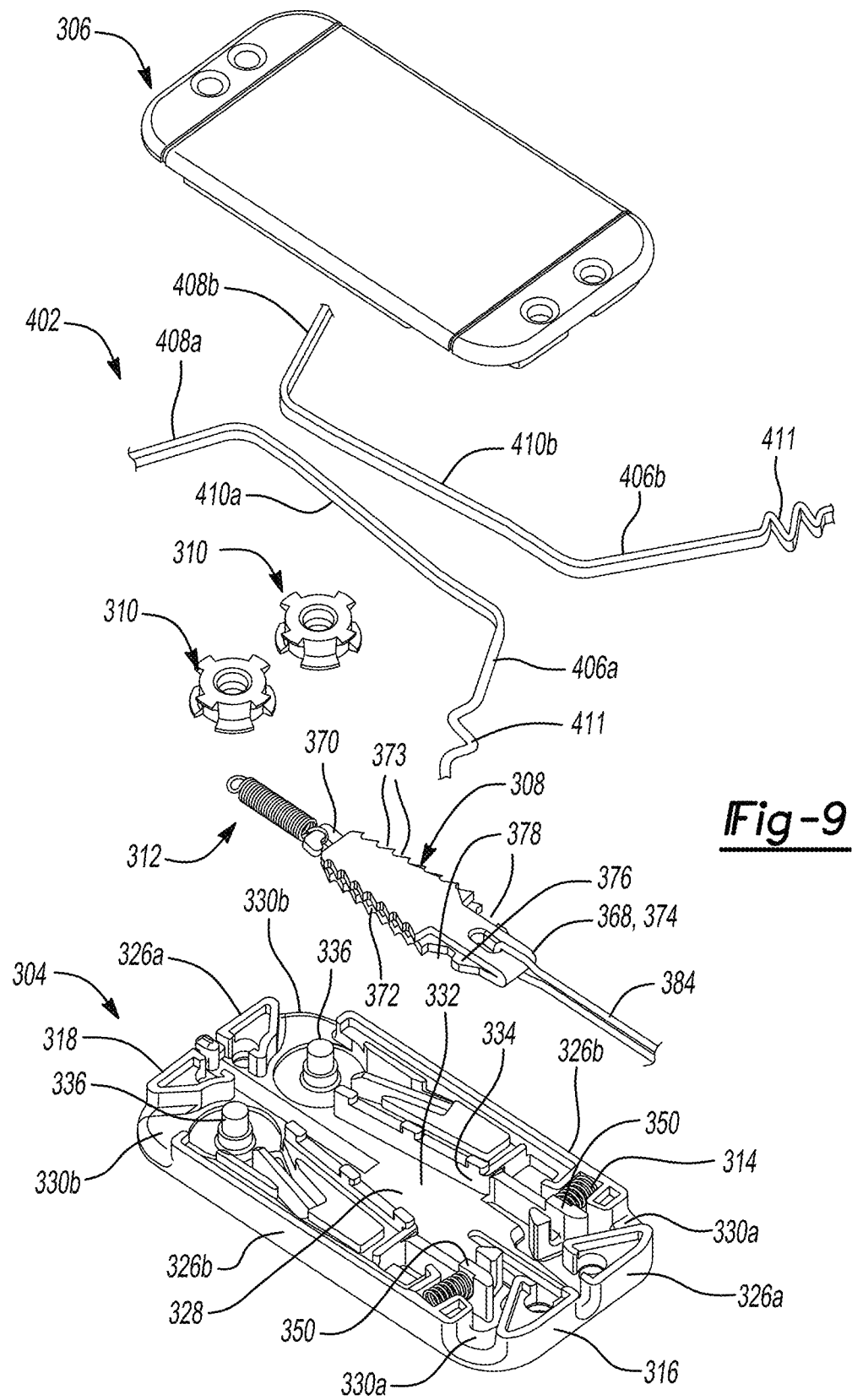
FIG. 9 is an exploded view of the locking device of FIG. 8 showing a housing and a locking member of the locking device.

As shown in FIGS. 8 and 9, the locking device 300 includes an enclosure 302 having a housing 304 and a cover 306, a locking member or lock 308 disposed within the enclosure 302 and configured to selectively engage the cable 402, and one or more rotary cable guides 310 disposed within the enclosure 302. As described in greater detail below, in some examples the rotary cable guides 310 cooperate with cable 402 and the enclosure 302 to provide at least one of an audible feedback and a tactile feedback when the cable 402 passes through the locking device 300. The locking device 300 further includes a first biasing member or spring 312 configured to bias the locking member 308 towards an engaged or locked position, and a pair of second biasing members or springs 314 configured to cooperate with the housing 304 to retain the locking member 308 in a disengaged or unlocked position, as described below with respect to FIGS. 5 and 6.

With continued reference to FIGS. 9-13, the housing 304 defines a length extending between a first end 316 and a second end 318. The housing 304 includes a base portion 320 having an outer surface 322 and a cable-receiving inner surface 324 formed on an opposite side of the base portion 320 from the outer surface 322. A peripheral wall 326 extends from the inner surface 324 and cooperates with the base portion 320 and the cover 306 to define a main cavity 328 of the enclosure 302, configured to receive the cable 402, the locking member 308, and the cable guides 310. In the illustrated example, the peripheral wall 326 includes a pair of end walls 326a at each of the first end 316 and the second end 318, and an opposing pair of sidewalls 326b extending between the end walls 326a define a substantially rectangular housing. In other examples, the peripheral wall 326 may be continuous and define an annular peripheral wall of a circular enclosure 302, or may be multi-faceted and define a polygonal enclosure 302.

The sidewall 326 may include a plurality of cable openings 330 formed therethrough for providing communication between the main cavity 328 and an exterior of the enclosure 302. In the illustrated example, the openings 330 include a first pair of openings 330a proximate to the first end 316 for receiving a first end of the cable 402, and a second pair of openings 330b proximate to the second end 318 for receiving a second end of the cable 402. Although the openings 330a, 330b of the illustrated example are shown as being formed through corners of the enclosure, the openings 330a, 330b may be formed entirely in the end walls 326a or entirely in the sidewalls 326b.

With continued reference to the locking device 300, the housing 304 includes a locking channel 332 defined by an opposing pair of locking or engagement surfaces 334 that converge toward one another such that the locking channel is associated with a wedge-shaped configuration tapering toward the second end 318 of the housing 304. Accordingly, the engagement surfaces 334 are defined by corresponding sidewalls of the housing 304 converging toward one another and extending between the inner surface 324 of the base portion 320 and the cover 306 to define the locking channel 332. As described in greater detail below, the engagement surfaces 334 cooperate with the locking member 308 to secure the cable 402.

Figure 10:
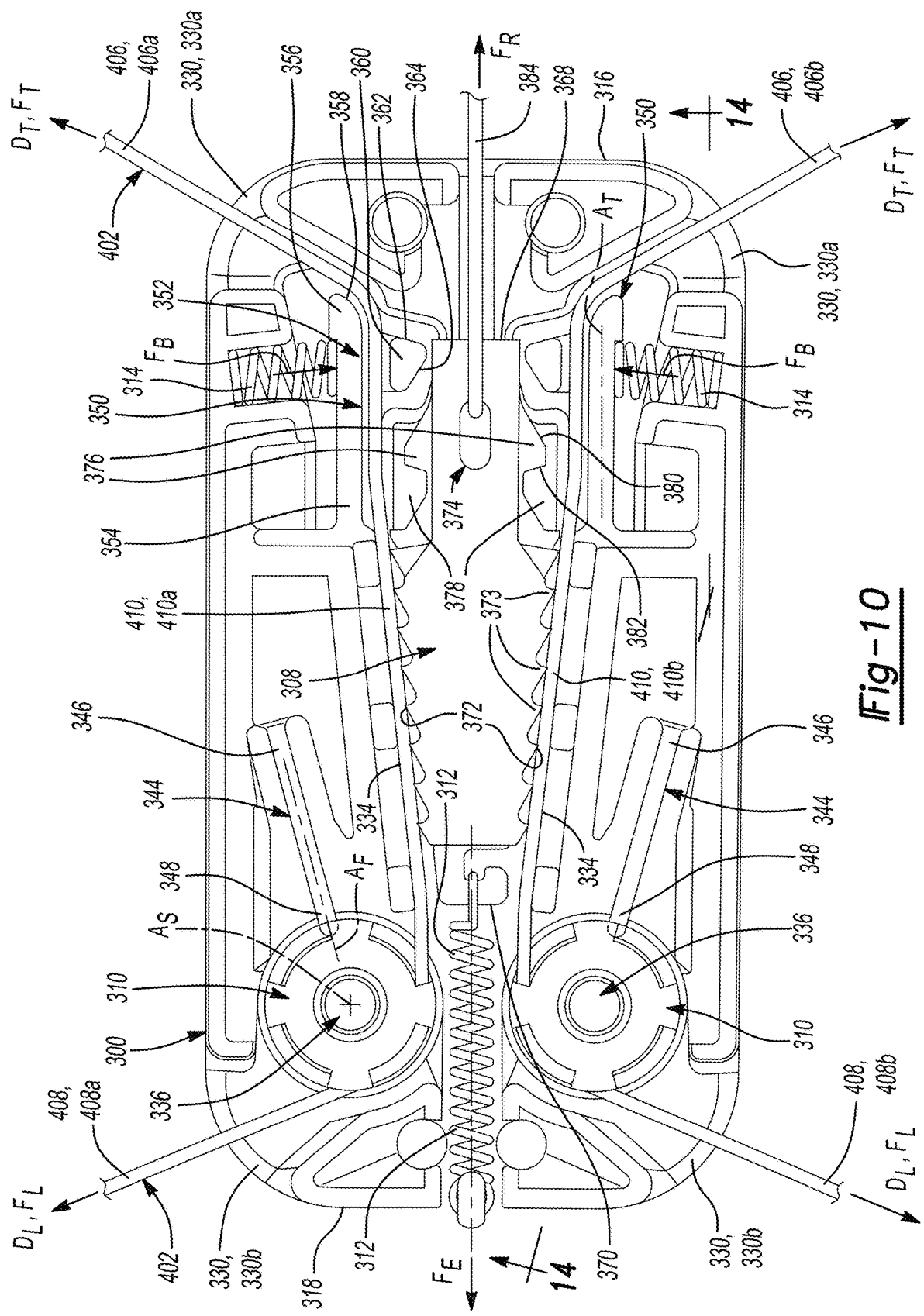
FIG. 10 is a top view of the locking device of FIG. 8 showing a housing having a lid removed to expose a locking member slidably disposed within the housing when the locking member is in a locked position.
Figure 11:
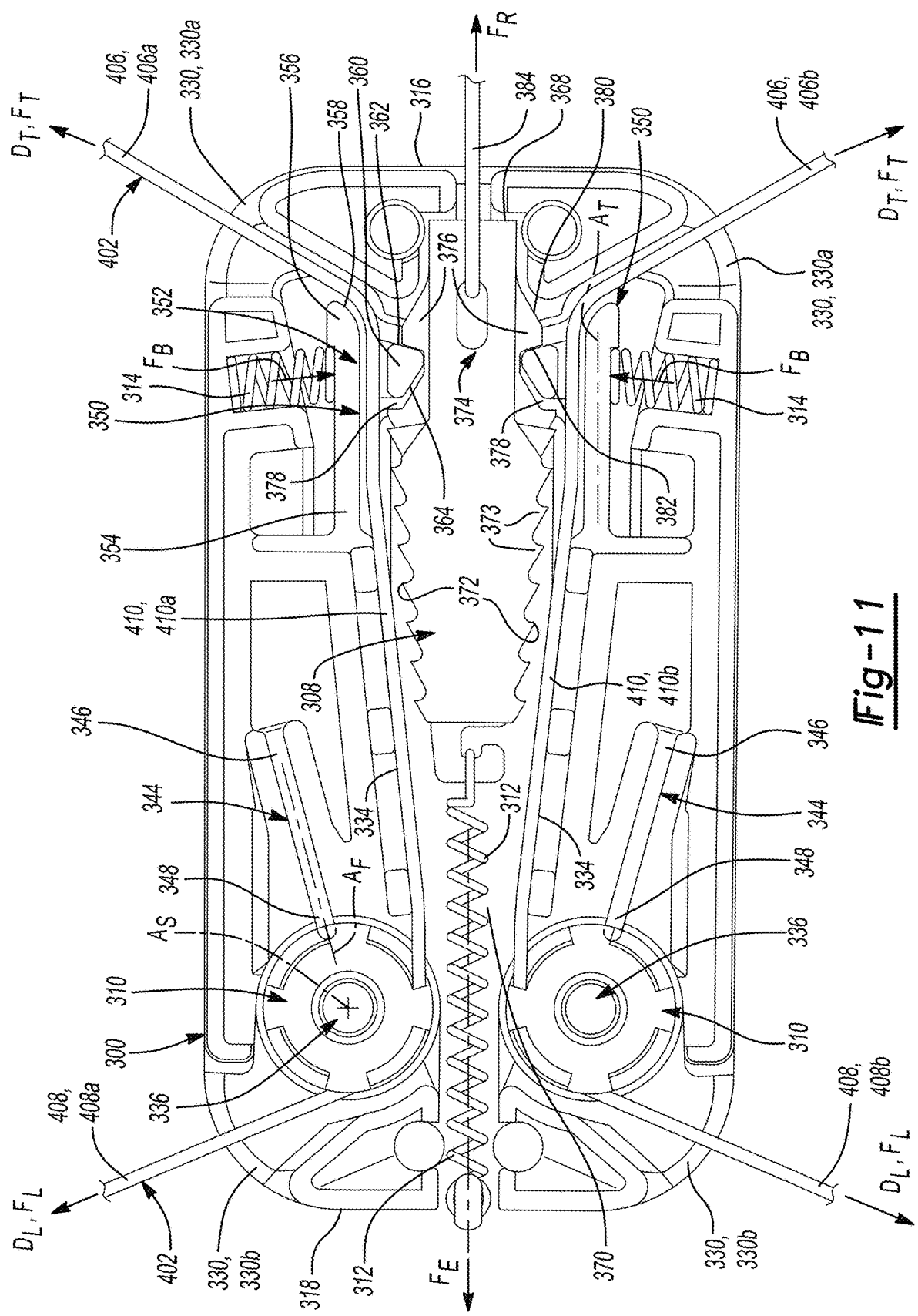
FIG. 11 is a top view of the locking device of FIG. 8 showing a housing having a lid removed to expose a locking member slidably disposed within the housing when the locking member is in an unlocked position.
Figure 13:
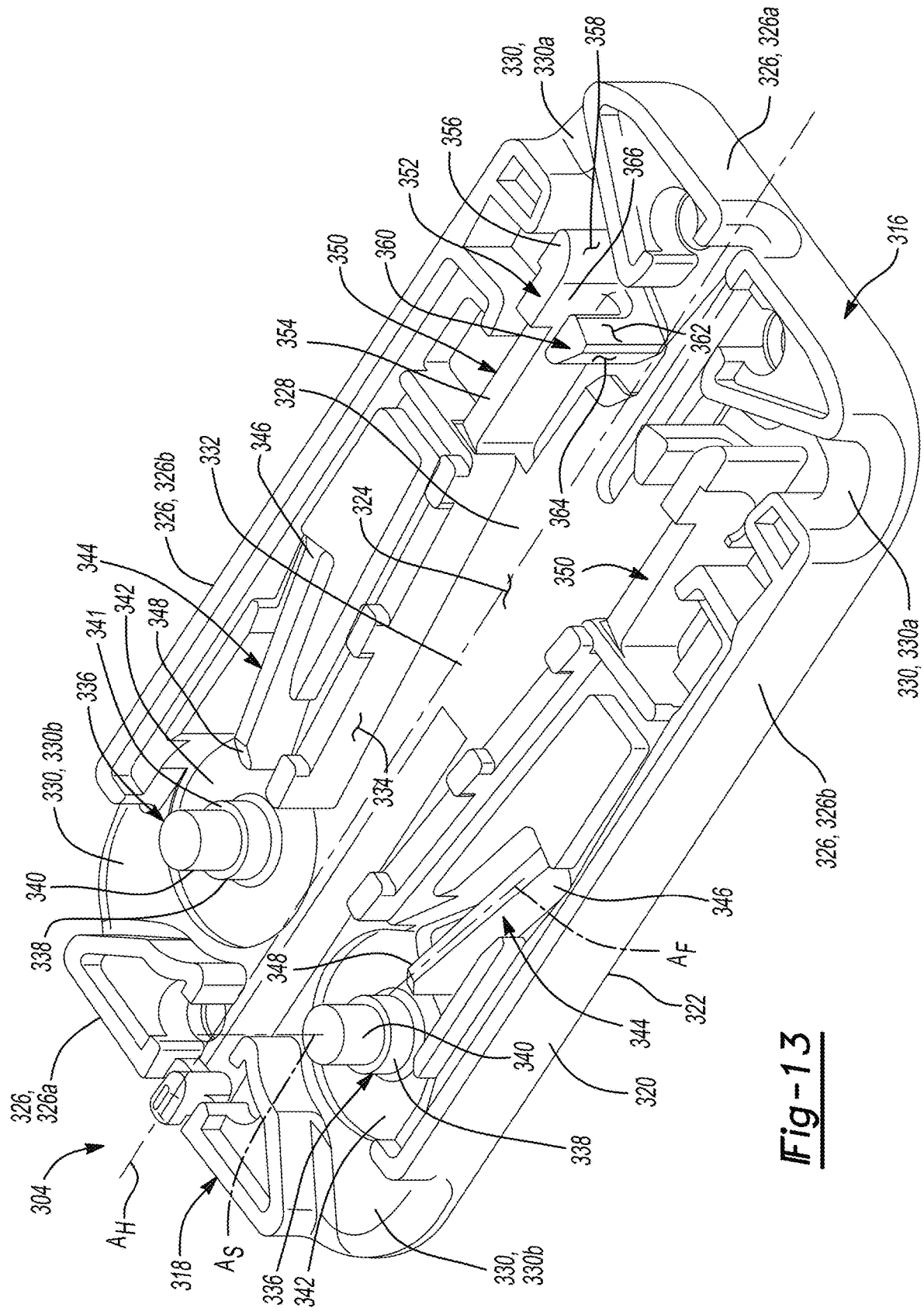
FIG. 13 is a perspective view of a housing of the locking device of FIG. 8, whereby the housing includes a prong for interfacing with the pulley of the locking device.

The housing 304 further includes one or more shafts 336 configured to be received by the cable guides 310, and to act as an axle, or spindle, about which a cable guide co-axially rotates. As shown in FIG. 13, the housing 304 includes a pair of the shafts 336 respectively disposed between the locking channel 332 and each of the second openings 330b. Accordingly, the shafts 336 are positioned within the housing 304 such that the cable guides 310 will be engaged by the cable 402 as the cable 402 passes between the locking channel 332 and the second openings 330b, as shown in FIGS. 10 and 11. However, the shafts 336 may be positioned in other areas of the housing 304 such that the cable guides 310 are arranged along a path of the cable 402.

Figure 12:
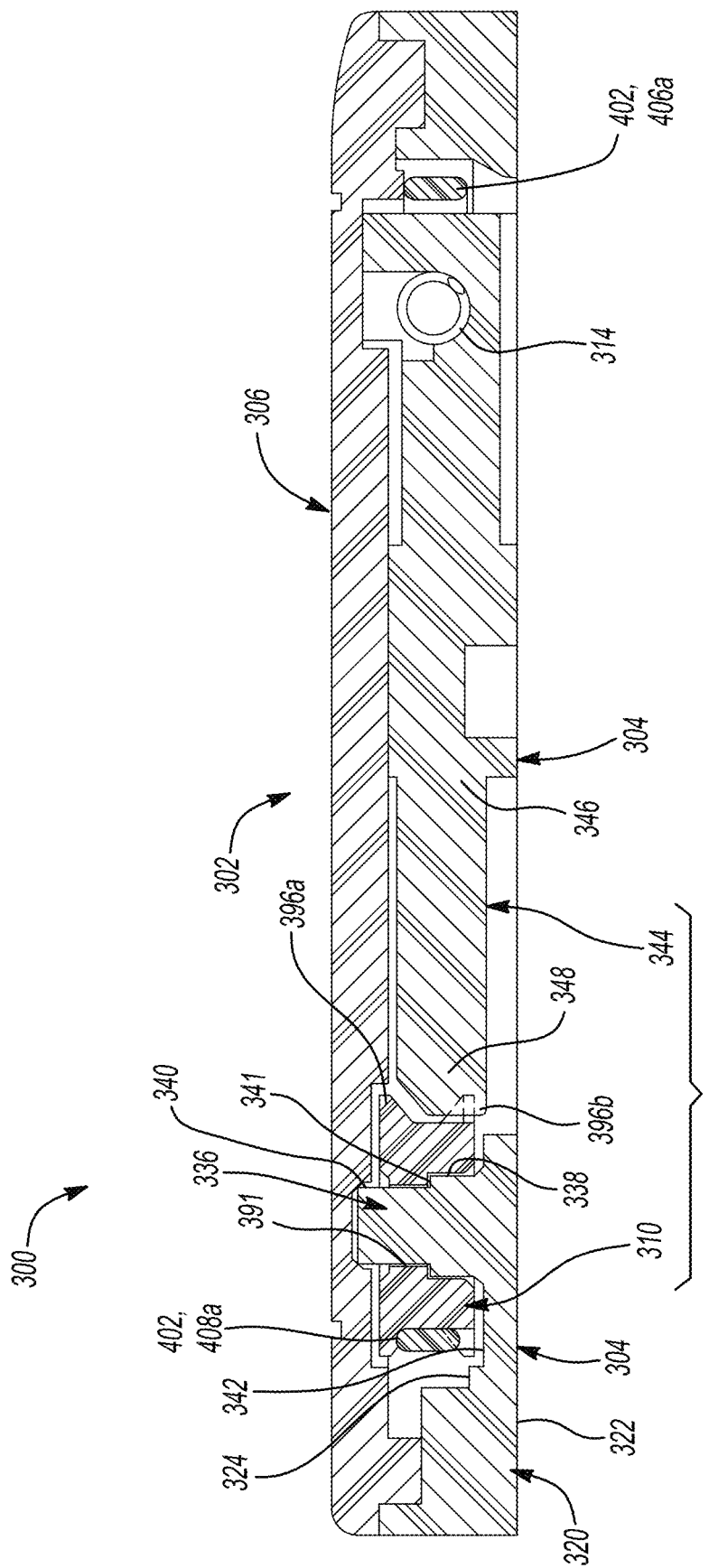
FIG. 12 is a cross-sectional view of the locking device of FIG. 8 taken along section line 12-12 of FIG. 10, and showing an interface between a pulley and a prong of the locking device.

With continued reference to FIG. 13, each of the shafts 336 may include a shoulder portion 338 protruding a first distance from the inner surface 324 of the base portion 320 and having a first diameter. The shaft 336 further includes a neck portion 340 extending a second distance from a distal end of the shoulder portion 338 and having a second diameter. The differences in diameters between the shoulder portion 338 and the neck portion 340 define a planar bearing surface 341 for rotatably supporting the cable guides 310, as shown in FIG. 12. An annular recess 342 configured to rotatably receive one of the cable guides 310 is formed in the inner surface 324 of the base portion 320 and is concentric with the shaft 336. Accordingly, as discussed below, the cable guides 310 are configured to rotate about the shafts 336 and within the recesses 342 when the cable 402 passes through the locking device 300.

Figure 14:
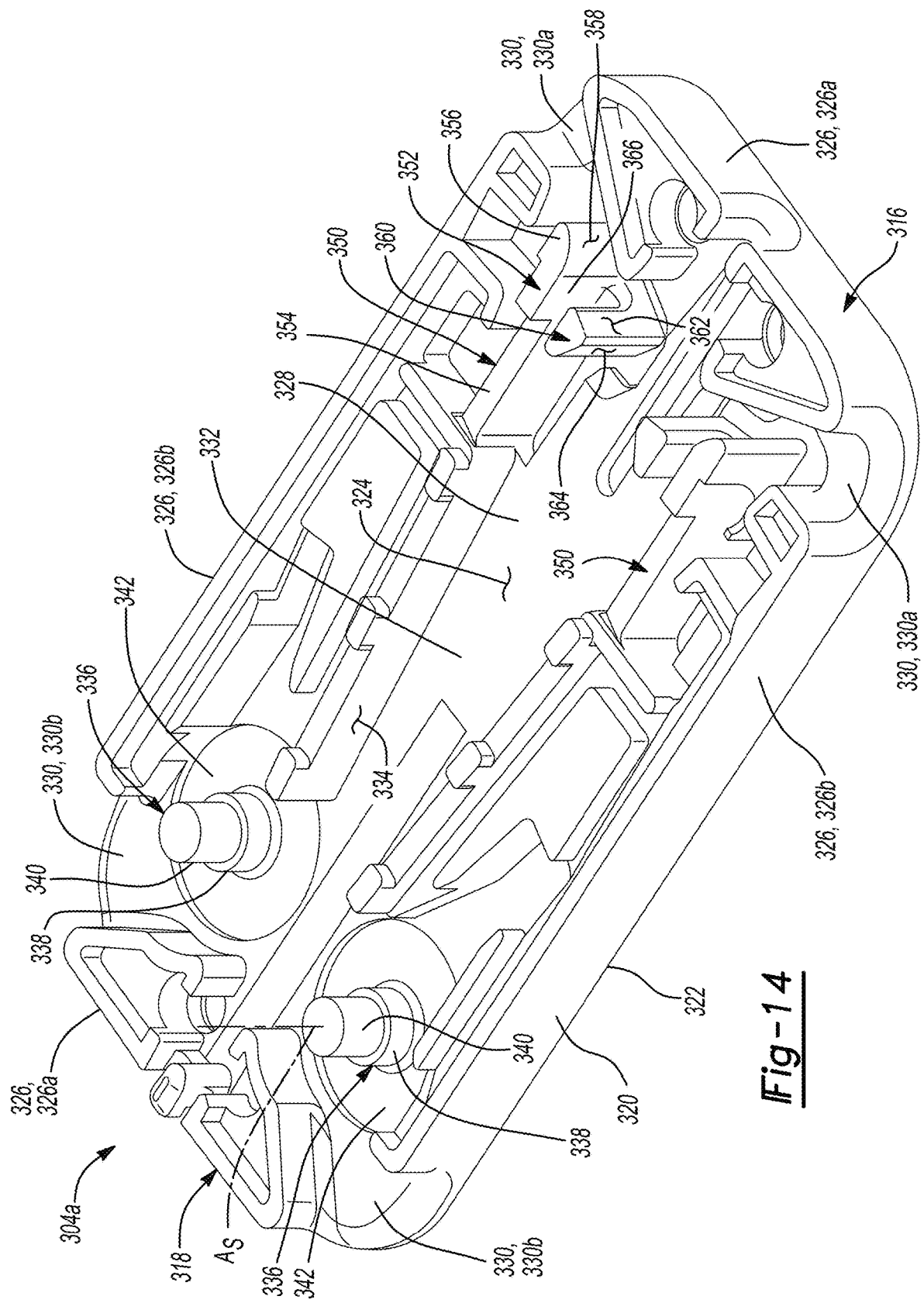
FIG. 14 is a perspective view of another example of a housing of the locking device of FIG. 8 without the prong of FIG. 13.
Figure 15:
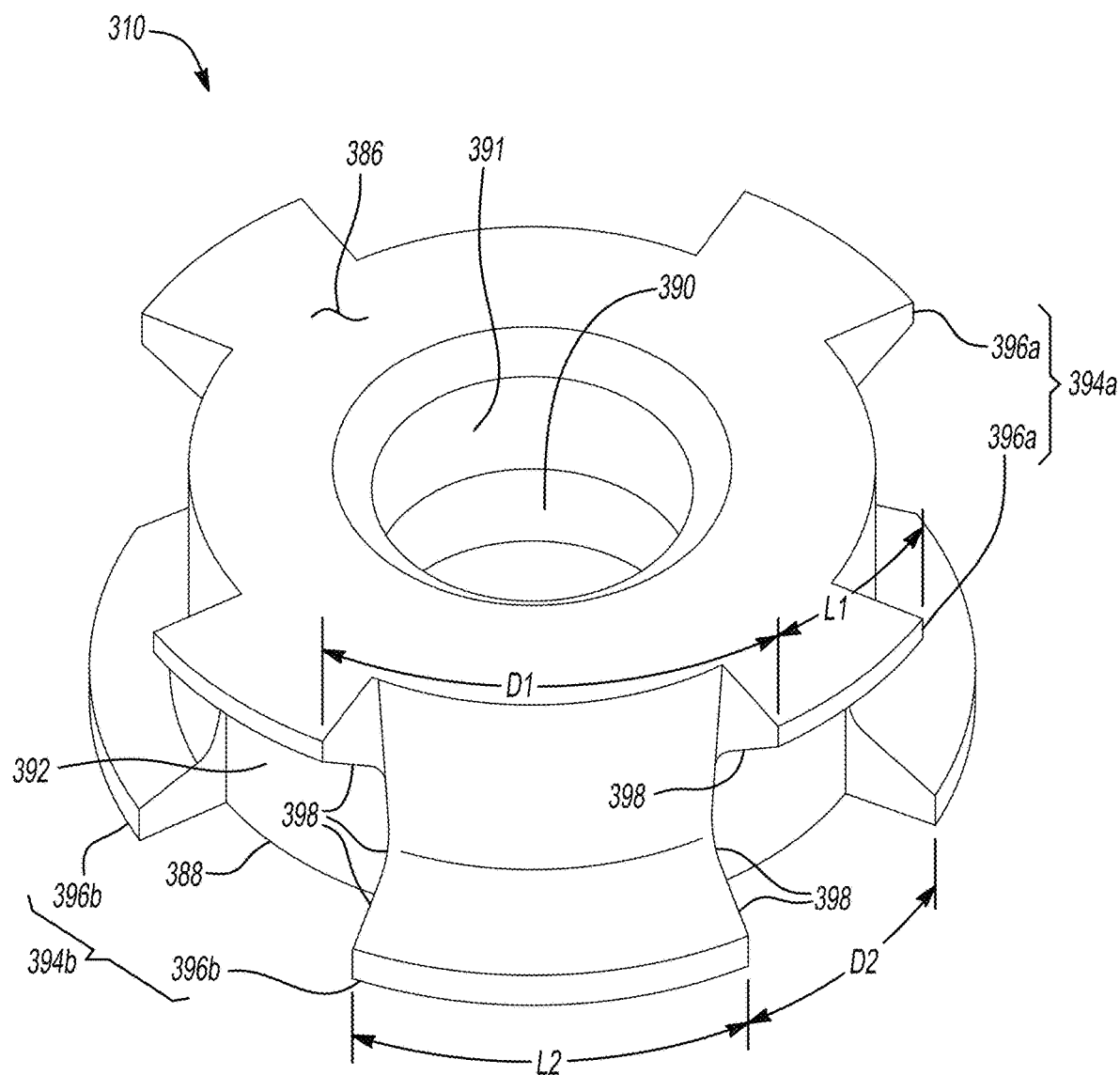
FIG. 15 is a perspective view of a pulley of the locking device of FIG. 8.

As shown in FIG. 14, the housing 304 may include a pair of prongs 344 having a first end 346 fixed to the housing 304 and a free-hanging distal end 348 configured to intermittently engage the cable guides 310 to produce an incremental audible output corresponding to movement of the cable 402 through the housing 304 by a predetermined distance, as described in greater detail below. In the illustrated example, the first end 346 of each of the prongs 344 is attached to a side of a boss that extends from the inner surface 324 of the base portion 320. In other examples, the prong 344 may be attached directly to the base portion 320 or one of the sidewalls 326 of the housing 304. In another example, the housing 304, 304a may be formed without the prongs, as shown in FIG. 15.

Each prong 344 extends along a longitudinal axis $A_F$ from the first end 346 in a direction towards a respective one of the shafts 336. In some examples, the longitudinal axis $A_F$ of each prong 344 intersects a central axis $A_S$ of a respective one of the shafts 336. The prong 344 is configured to resiliently flex along the longitudinal axis $A_F$, such that the distal end 348 of the prong 344 is operable between an interference position and a clearance position. In the interference position, the distal end 348 of the prong 344 extends into a rotational path of an outer periphery of the cable guide 310, whereas the distal end 348 of the prong 344 is disposed outside of the outer periphery of the cable guide 310 when the prong 344 is in the clearance position. Accordingly, as the cable 402 is pulled through the locking device 300, the cable guides 310 are caused to rotate about the shafts 336 to intermittently engage the distal ends 348 of the prongs 344, thereby causing an audible and tactile feedback to be provided to the user to indicate movement of the cable 402. Accordingly, the cooperation of the pulleys 310 and the prongs 344 may define a feedback mechanism 349 of the locking device 300. As provided above, the housing 304a may be formed without the prongs, as shown in FIG. 14. When the housing 304a is formed without the prongs, the pulleys 310 may rotate freely within the housing without providing feedback to the user.

With reference to FIGS. 10 and 13, the housing 304 includes a pair of retention features 350 configured to selectively engage the locking member 308 and to secure the locking member 308 in the unlocked position, as shown in FIG. 13. The retention features 350 associated with the housing 304 may include a first retention feature 350 and a second retention feature 350 disposed on opposite sides of the housing 304, whereby the retention features 350 are biased inward toward the locking member 308 by the second biasing members 314. In the illustrated example, the retention features 350 each include a flexible tab 352 integrally formed with the housing 304 such that the retention features 350 act as living hinges movable between an engaged state and a disengaged state for allowing the locking member 308 to pass therebetween. Accordingly, each tab 352 extends along a longitudinal axis $A_T$ from a fixed first end 354 to a detached distal end 356. As shown, the distal ends 356 of each tab 352 may partially define a path of the cable 402 between the locking channel 332 and the openings 330a at the first end 316 of the housing 304. Accordingly, the distal end 356 may include a convex inner guide surface 358 along which the cable 402 passes between the locking channel 332 and a respective one of the first openings 330a.

Each of the retention features 350 further includes a projection 360 extending laterally into the locking channel 332 from the distal end 356 of the tab 352. A width of the projection 360 may taper along a direction from the first end 316 to the second end 318, such that the projection 360 includes a retention surface 362 facing the first end 316 of the housing 304 and a biasing surface 364 formed on the opposite side of the projection 360 from the retention surface 362. Each of the retention surface 362 and the biasing surface 364 may be formed at an oblique angle with respect to a longitudinal axis $A_H$ of the housing 304. However, an angle of the retention surface 362 with respect to the longitudinal axis $A_H$ may be greater than the angle of the biasing surface 364, such that the retention surface 362 is configured to provide greater resistance to movement of the locking member 308 towards the second end 318 (i.e. the locked state) than towards the first end 316 (i.e. the unlocked state). In the illustrated example, the projection 360 is spaced apart from the distal end 356 of the tab 352, and cooperates with the distal end 356 to define a track 366 or passage for guiding the cable 402 from the locking channel 332 to one of the first openings 330a.

With continued reference to FIG. 9-11, the locking device 300 includes a pair of the second biasing members 314 configured to bias the distal ends 356 and, consequently, the projections 360 of the retention features 350 inwards toward the locking channel 332. In the illustrated example, the biasing members 314 are compression springs that apply a continuous biasing force $F_B$ to the distal ends 356 of the tabs 352. In other examples, the biasing force $F_B$ may be applied by other types of biasing members 314, such as tension springs, coil springs, or by forming the first end 354 of the tab 352 as a resilient living hinge.

Referring to FIGS. 10 and 11, the locking member 308 is configured to be slideably received within the locking channel 332 of the housing 304. As provided above, the locking member 308 is operable between a locked state and an unlocked state to selectively lock the cable 402. The locking member 308 includes a first end 368, a second end 370, and a pair of lock surfaces 372 formed on opposite sides of the locking member between the first end 368 and the second end 370. In some examples, the lock surfaces 372 converge toward one another along a direction from the first end 368 to the second end 370, such that the lock surfaces 372 are parallel to respective ones of the engagement surfaces 334 of the housing 304 when the locking member 308 is disposed within the locking channel 332. In the example shown, the lock surfaces 372 include projections or teeth 373 configured to permit movement by the cable 402 towards the first end 316 of the housing 304 while restricting movement by the cable 402 towards the second end 318 of the housing 304 by gripping the cable 402 when the locking member 308 is in the locked state.

The first end 368 of the locking member 308 may include a tab portion 374 having flared protuberances 376 extending outwardly therefrom, and a pair of detents 378 formed between the protuberances 376 and the lock surfaces 372. Generally, the protuberances 376 include a biasing surface 380 facing toward the first end 368 of the locking member 308 and a retention surface 382 facing in an opposite direction from the biasing surface 380. The retention surface 382 defines a portion of the detent 378. The biasing surfaces 380 of the protuberances 376 are configured to interface with the biasing surfaces 364 of the retention features 350 to spread the projections 360 apart from each other as the protuberances 376 pass between the projections 360 when the locking member 308 is moved towards the first end 316 of the housing 304. The retention surfaces 382 of the protuberances 376 are configure to interface with the retention surfaces 362 of the retention features 350 to secure the locking member 308 in the unlocked state, as shown in FIG. 13.

With continued reference to FIGS. 9-11, the locking member 308 includes the first biasing member 312 attached to the second end 370 and a release cord 384 attached to the first end 368. As shown, the first biasing member 312 is a tension spring having a first end attached to the second end 370 of the locking member 308 and a second end attached to the second end 318 of the housing 304. Accordingly, the first biasing member 312 is configured to apply a continuous engaging force $F_E$ to the locking member 308 to bias the locking member 308 towards the locked state. Conversely, the release cord 384 is attached to the tab 374 at the first end 368 of the locking member 308 and is configured to transmit a selectively-applied release force $F_R$ to the first end 368 of the locking member 308. As discussed below, when the release force $F_R$ is greater than the engaging force $F_E$, the locking member 308 will move from the locked state towards the unlocked state.

FIG. 10 provides a top view of the locking device 300 with the cover 306 removed to show the locking member 308 disposed within the locking channel 332 of the housing 304 while in the locked state. In some examples, the locking member 308 is biased into the locked state by the first biasing member 312. For instance, FIG. 10 shows the first biasing member 312 exerting the engaging force $F_E$ upon the locking member 308 to urge the second end 370 of the locking member 308 toward the second end 318 of the housing 304, and thereby bias the locking member 308 into the locked state. While in the locked state, the locking member 308 restricts movement of the cable 402 relative to the housing 304 by pinching the locking portions 410a, 410b of the cable 402 between the engagement surfaces 334 and the lock surfaces 372. Accordingly, the locked state of the locking member 308 restricts the cable 402 from moving in the loosening direction $D_L$ when the loosening force $F_L$ is applied to the loosening grip 118. In the example shown, the locking member 308 permits movement of the cable 402 when the tightening force $F_T$ is applied to the cable 402, as this direction causes the cable 402 to apply a force on the locking member 308 due to the generally wedge shape of the locking member 308, thereby moving the locking member 308 into the unlocked state. The locking member 308 automatically returns to the locked state once the force applied to the cable 402 is released due to the forces imparted on the locking member 308 by the biasing member 312.

FIG. 11 provides a top view of the locking device 300 with the cover 306 removed to show the locking member 308 disposed within the locking channel 332 of the housing 304 while in the unlocked position. In some examples, the release cord 384 attached to the tab 374 of the locking member 308 applies the release force $F_R$ upon the locking member 308 to move the locking member 308 away from the engagement surfaces 334. Here, the release force $F_R$ is sufficient to overcome the engaging force $F_E$ of the first biasing member 312 to permit the locking member 308 to move relative to the housing 304 such that the pinching upon the locking portions 410a, 410b of the cable 402 between the lock surfaces 372 and the engagement surfaces 334 is released. In some examples, the engaging force $F_E$ causes the locking member 308 to transition back to the locked position when the release force $F_R$ applied by the release cord 384 is removed.

Figure 5:
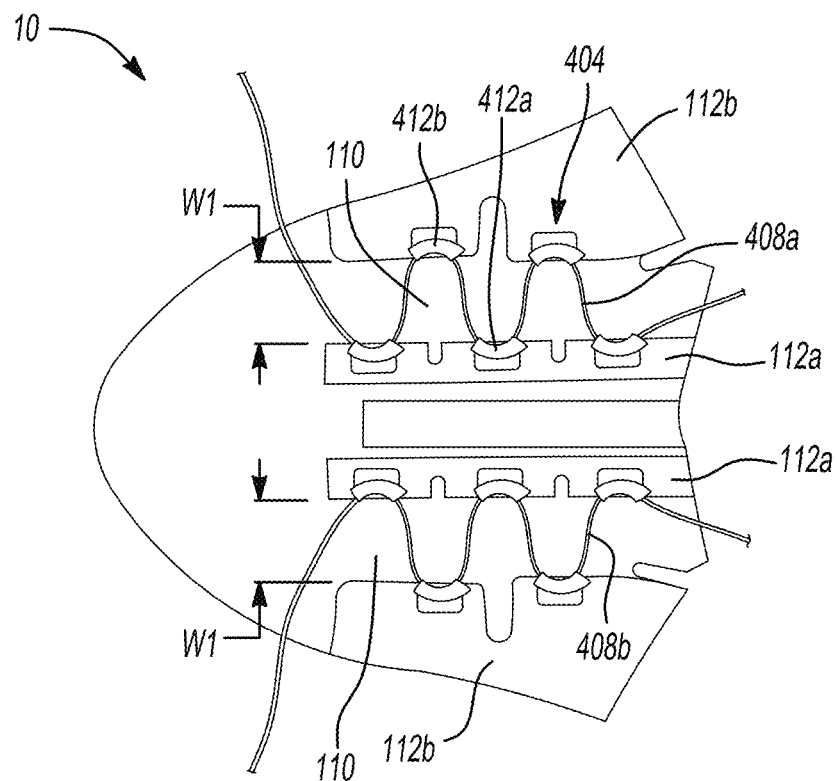
FIG. 5 is a top view of a pattern of an upper of the article of footwear of FIG. 1 while in a loosened state.
Figure 6:
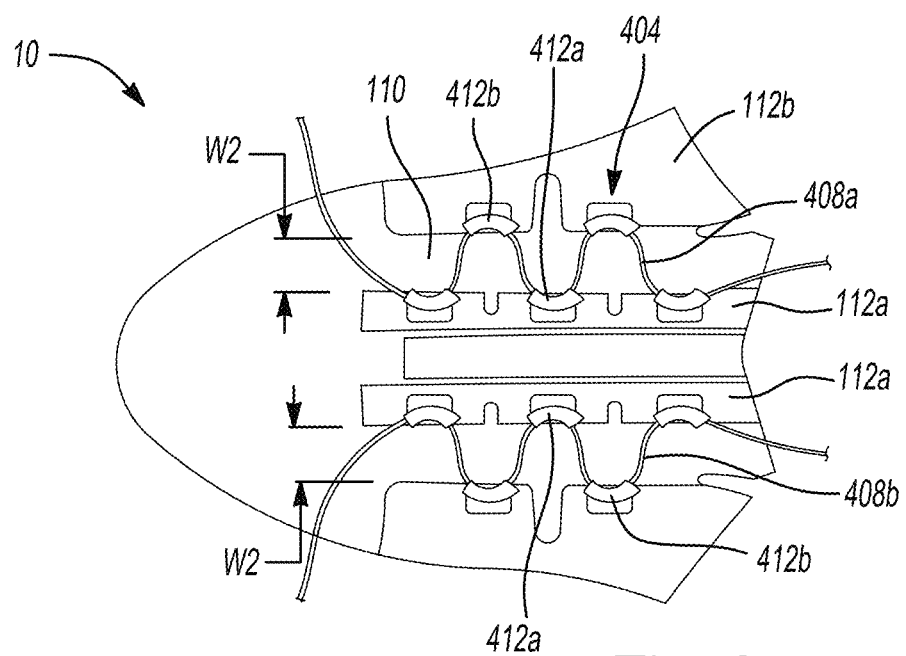
FIG. 6 is a top view of a pattern of an upper of the article of footwear of FIG. 1 while in a tightened state.

While in the unlocked state, the locking member 308 permits movement of the cable 402 relative to the housing 304 by allowing the locking portions 410a, 410b of the cable 402 to freely move between the respective lock surfaces 372 and the engagement surfaces 334. The unlocked state of the locking member 308 permits movement of the cable 402 in both the tightening direction $D_T$ and the loosening direction $D_L$ when the pulling forces $F_T$, $F_L$ are applied to respective ones of the control portion 406 and the fastening portion 408. Movement of the cable 402 in the tightening direction $D_T$ causes the an effective length of the fastening portion 408 to decrease to constrict the elastic regions 110 of the upper 100 and thereby move the upper 100 into the tightened state for closing the interior void 102 around the foot, while movement of the cable 402 in the loosening direction $D_L$ causes an effective length of the fastening portion 408 to increase to allow elastic regions 110 to revert back to their flat, relaxed states and thereby facilitate a transition of the upper 100 from the tightened state to the loosened state such that the foot can be removed from the interior void 102, as shown in FIGS. 5 and 6.

In some examples, a sufficient magnitude and/or duration of the release force $F_R$ applied to the release cord 384 causes the release cord 384 to apply the release force $F_R$ upon the locking member 308 in a direction opposite the direction of the engaging force $F_E$ such that the locking member 308 moves away from the engagement surfaces 334 relative to the housing 304 and toward the first end 316 of the housing 304. At least one of the retention features 350 of the housing 304 may engage the detent 378 of the locking member 308 when release force $F_R$ moves the locking member 308 a predetermined distance away from the engagement surfaces 334 of the housing 304, as shown in FIG. 13. Here, engagement between the detents 378 of the locking member 308 and the at least one retention feature 350 of the housing 304 maintains the locking member 308 in the unlocked position once the release force $F_R$ is released. The engaging force $F_E$ of the first biasing member 312 and the forces exerted by the pair of second biasing members 314 on the retention features 350 lock the projections 360 of the retentions features 350 into engagement with the detents 378 of the locking member 308 after the locking member 308 moves the predetermined distance and the release force $F_R$ is no longer applied.

In some scenarios, a release force $F_R$ associated with a first magnitude may be applied to the release cord 384 to move the locking member 308 away from the engagement surfaces 334 by a distance less than the predetermined distance such that the retention features 350 do not engage. In these scenarios, the release force $F_R$ associated with the first magnitude can be maintained when it is desirable to move the cable 402 in the loosening direction $D_L$ (e.g., by applying the loosening force $F_L$ to the loosening grip 118) or the tightening direction $D_T$ (e.g., by applying the tightening force $F_T$ to the control portion 406) for adjusting the fit of the interior void 102 around the foot. Once the desired fit of the interior void 102 around the foot is achieved, the release force $F_R$ can be released to cause the locking member 308 to transition back to the locked position so that movement of the cable 402 is restricted in the loosening direction $D_L$ and the desired fit can be sustained. It should be noted that even when the locking member 308 is in the locked position, the cable 402 can be moved in the tightening direction $D_T$. As such, once the loosening force $F_L$ is released and a desired fit is achieved, the locking member 308 automatically retains the desired fit by locking a position of the cable 402 relative to the housing 304.

In other scenarios, a release force $F_R$ associated with a second magnitude greater than the first magnitude can be applied to the release cord 384 to move the locking member 308 the predetermined distance away from the engagement surfaces 334 to cause the corresponding retention features 350 to engage the detents 378. Engagement of the retention features 350 is facilitated by providing the projections 360 of the retention features 350 with a tapered biasing surface 364 that opposes the locking member 308 to allow the locking member 308 to more easily move the retention features 350 against the biasing force $F_B$ imparted thereon by the second biasing members 314 when the release cord 384 is pulled the predetermined distance. In these scenarios, engagement between the corresponding retention features 350 and the detents 378 maintains the locking member 308 in the unlocked position when the release force $F_R$ is released.

The locking member 308 is returned to the locked position when a tightening force $F_T$ is applied to the control portion 406. Namely, when the tightening force $F_T$ is applied to control portion 406, the lateral control portion 406a and the medial control portion 406b are placed in tension which, in turn, exerts a force on the second biasing members 314 via the distal ends 356 of the tab 352 of the retention features 350, as the lateral control portion 406a and the medial control portion 406b pass through the first openings 330a, as shown in FIG. 10. In so doing, the distal ends 356 of the retention features 350 compress the second biasing members 314 and, as such, cause the projections 360 of the retention features 350 to move away from one another and disengage the detents 378 of the locking member 308, thereby allowing the first biasing member 312 to return the locking member 308 to the locked position.

With reference to FIGS. 9-12, the cable guides 310 could be pulleys 310 that are rotatably coupled to the shafts 336 of the housing 304. As shown in FIG. 15, each pulley 310 includes an upper surface 386, a lower surface 388 defining a thickness of the pulley 310, and an aperture 390 extending through the thickness of the pulley 310 and configured to rotatably receive the shaft 336 of the housing 304. The aperture 390 may include an inwardly extending flange 391 having an inner surface for rotatably receiving the neck portion 340 of the shaft 336, and a lower surface supported by the bearing surface 341 of the shoulder portion 338 of the shaft 336, as shown in FIG. 12. An outer wall 392 of the pulley 310 extends between the upper surface 386 and the lower surface 388 and defines a minor diameter of the pulley.

Referring to FIG. 15, each pulley 310 includes an upper flange 394a and a lower flange 394b. The upper flange 394a is collectively formed by a plurality of upper protrusions 396a spaced evenly around the outer wall 392 of the pulley 310, adjacent to the upper surface 386. The upper protrusions 396a each extend a first length L1 around the outer wall 392 of the pulley 310, and are spaced apart by a first distance D1. Similarly, the lower flange 394b is collectively formed by a plurality of lower protrusions 396b spaced evenly about the outer wall 392 of the pulley 310, adjacent to the lower surface 388. The lower protrusions 396b extend a second length L2 around the outer wall 392 of the pulley, and are spaced apart by a second distance D2.

In the illustrated example, first length L1 of the upper protrusions 396a is the same as the second distance D2 between the lower protrusions 396b and the second length L2 of the lower protrusions 396b is the same as the first distance D1 between the upper protrusions 396a. Furthermore, each of the upper protrusions 396a is axially aligned with the spaces formed between adjacent ones of the lower protrusions 396b. Accordingly, the upper protrusions 396a and the lower protrusions 396b are alternatingly arranged around the outer wall 392 and do not overlap in an axial direction of the pulley 310. In other examples, different lengths and spaces may be used so that the protrusions 396a, 396b overlap each other in the axial direction.

The upper protrusions 396a and the lower protrusions 396b cooperate with the outer wall 392 of the pulley 310 to define a groove 398 configured to receive a portion of the cable 402 therein. As described above, when the flanges 394a, 394b are defined by the protrusions 396a, 396b, the groove 398 may be intermittently and alternatingly defined by the protrusions 396a, 396b. Accordingly, the cable 402 will be continuously contained within the groove 398 by at least one of the upper protrusions 396a and the lower protrusions 396b.

With reference to the cross-sectional view of FIG. 12, each of the pulleys 310 are configured to be received within a respective one of the annular recesses 342 of the housing 304 such that the distal end 348 of one of the prongs 344 extends into the spaces formed between adjacent ones of the lower protrusions 396b. Accordingly, the distal ends 348 of the prongs 344 interfere with a rotational path of the lower protrusions 396b. As the pulley 310 rotates, the lower protrusions 396b intermittently engage the distal ends 348 of the prongs 344. This intermittent engagement provides both an audible feedback, in the form of a clicking noise, and a tactile feedback in the form of intermittent increases in resistance. Accordingly, the cooperation of the pulley 310 and the prongs 344 may be referred to as defining the feedback mechanism 349 of the locking device 300.

With reference to FIGS. 1 and 9, the fastening system 400 includes the cable 402 and a tracking system 404 formed on or in the upper 100 and the sole structure 200 for routing the cable 402 and distributing tension of the cable 402 along the article of footwear 10.

The cable 402 may be may be formed from one or more fibers. For instance, the fibers may include polyethylene fibers. Additionally or alternatively, the cable 402 may be formed from a molded monofilament polymer and/or a woven steel with or without other lubrication coating. In some examples, the cable 402 includes multiple strands of material woven together.

In the illustrated example, the cable 402 includes the control portion 406 extending from the first openings 330a formed proximate to the first end 316, the fastening portion 408 extending from the second openings 330b, and a pair of locking portions 410 extending between the control portion 406 and the fastening portions 408.

The control portion 406 is configured to have a tightening force $F_T$ applied thereto to move the cable 402 in the tightening direction $D_T$. When incorporated into the article of footwear 10, the control portion 406 may be arranged on the article of footwear 10 so that it can be easily grasped by the user to pull the cable 402 in the tightening direction $D_T$. The fastening portion 408 is configured to cooperate with the tracking system 404 to tighten the article of footwear 10 when the tightening force $F_T$ is applied to the control portion 406. Conversely, the fastening portions 408 are also configured to have a loosening force $F_L$ applied thereto to move the cable 402 in a loosening direction $D_L$. The locking portions 410a are disposed within the housing 304 and are configured to (i) rotate the pulleys 310 when the cable is pulled in the tightening direction $D_T$ and (ii) interface with the locking member 308 to secure the position of the control portion 406.

In some examples, each of the control portion 406 and the fastening portion 408 may be referred to as including a lateral portion 406a, 408a and a medial portion 406b, 408b. The lateral portions 406a, 408a and the medial portions 406b, 408b may be connected to each other such that each of the control portion 406 and the fastening portion 408 define continuous effective lengths of the cable 402 extending between the openings 330a, 330b. Alternatively, at least one of the control portion 406 and the fastening portion 408 may include separated lateral portions 406a, 408a and medial portions 406b, 408b. For example, as shown in FIG. 3, the fastening portion 408 may include a lateral fastening portion 408a extending from one of the first openings 330a to lateral terminal end 409a and a medial fastening portion 408b extending from the other of the first openings 330a to a medial terminal end 409b. The terminal ends 409a, 409b may operatively connect to one another along the bottom surface of the strobel 218 within the forefoot region 12 of the footwear 10. The lateral control portion 406a is connected to the lateral fastening portion 408a by a lateral locking portion 410a, and the medial control portion 406b is connected to the medial fastening portion 408b by the medial locking portion 410b.

While an overall length of the cable 402 remains constant, effective lengths of the control portion 406 and the fastening portion 408 of the cable 402 depend upon the position of the cable 402 with respect to the locking device 300. For example, when the control portion 406 is pulled and the cable 402 moves in the tightening direction $D_T$ through the locking device 300, the effective length of the control portion 406 will increase and the effective length of the fastening portion 408 will decrease. Conversely, when the fastening portion 408 is pulled and the cable 402 moves in the loosening direction $D_L$ through the locking device 300, the effective length of the fastening portion 408 will increase to loosen the article of footwear 10 and the effective length of the control portion 406 will decrease. As provided above, the locking portion 410 refers to the portion of the cable 402 that is contained within the locking device 300, regardless of the position of the cable 402. Accordingly, the effective lengths control portion 406, the fastening portion 408, and the locking portion 410 are not fixed sections of the cable 402 itself, but depend on the position of the cable 402 with respect to the locking device 300.

Although the illustrated example shows the cable 402 as being continuously formed, in other example the cable 402 may be fragmentary, whereby ends of one or more cables are attached to each other directly or indirectly to form the cable 402. For example, the cable 402 may comprise a first segment including the lateral control portion 406a, the lateral fastening portion 408a, and the lateral locking portion 410a, and a separately formed second segment including the medial control portion 406b, the medial fastening portion 408b, and the medial locking portion 410b. In this example, ends of the control portions 406a, 406b of each of the segments are attached to each other either directly, or by an intermediate component, to form a loop. As described above, ends of the fastening portions 408a, 408b may be attached to each other or to the upper 100.

The control portion 406 may include one or more accumulators 411 configured to maintain the control portion 406 in a position against the upper 100 as the cable 402 is moved from the tightened position to the loosened position. For example, when the tightening force $F_T$ is applied to the control portion 406, an effective length of the control portion 406 may increase as the cable 402 moves in the tightening direction $D_T$. To prevent the control portion 406 from having excess slack and sagging from the upper 100, the accumulators 411 take up the additional effective length of the control portion 406 so that the control portion 406 remains taut against the upper 100. In the illustrated example, the accumulators 411 may be tubes or conduits having a greater cross-section than a cross-section of the cable 402. In one configuration, the accumulators 411 may be formed from an elastic material to allow the cable 402 to be moved into the tightening direction $D_T$ away from the upper 100 and automatically return to a position adjacent to the upper 100 when a force exerted on the accumulator 411 is released. Once the force is released and the cable 402 is moved into the tightening direction $D_T$, the excess slack in the cable 402 is accommodated within the accumulator 411, as shown in FIGS. 1 and 3.

The fastening system 400 further includes the tracking system 404 including a plurality of cable guides 412 and conduits 414 integrated into the upper 100 and the sole structure 200 to distribute tension of the cable 402 along the article of footwear 10.

In some examples, at least one of the lateral side 18 and the medial side 20 of the upper 100 include a series of engagement features, or cable guides, 412 that extend along opposite sides of the elastic regions 110. As shown in the cross-sectional view of FIG. 2A, the cable guides 412 may each include a base 416 and a flange 418 extending from the base 416. The base 416 may be attached to the upper 100 such that the base 416 extends from the upper 100. The flange 418 may be integrally formed with the base 416 and may include a concave inner surface 420 that extends along an arcuate path. In the illustrated example, the cable guides 412 are oriented such that the arcuate path of the inner surface 420 is convex. The cable guides 412, and thus, the inner surface 420, may be formed from a low-friction material such as, for example, nylon. Further, the base 416 and flange 418 may be formed from a relatively rigid material to restrict movement of the cable guide 412 relative to the inelastic regions 112 to allow the cable guides 412 to remain in a desired position relative to the upper 100, thereby allowing the inner surface 420 to adequately guide the cable 402 relative to the upper 100. Finally, the flange 418 may include an outer surface 422 that is substantially parallel to the inner surface 420 and includes a concave shape. In other examples, the outer surface 422 may be planar, or have a convex shape.

In the illustrated example, the inner surface 420 and the outer surface 422 cooperate to provide the cable guide 412 with an overall curved profile such that the inner surface 420 includes a substantial C-shape that serves to receive and guide the fastening portion 408 of the cable 402, as shown in areas 2A and 2B of FIG. 2. In one configuration, the lateral and medial fastening portions 408a, 408b enter the cable guide 412, extend along the inner surface 420, and exit the cable guide 412 at a tangent to the inner surface 420.

Figure 4:
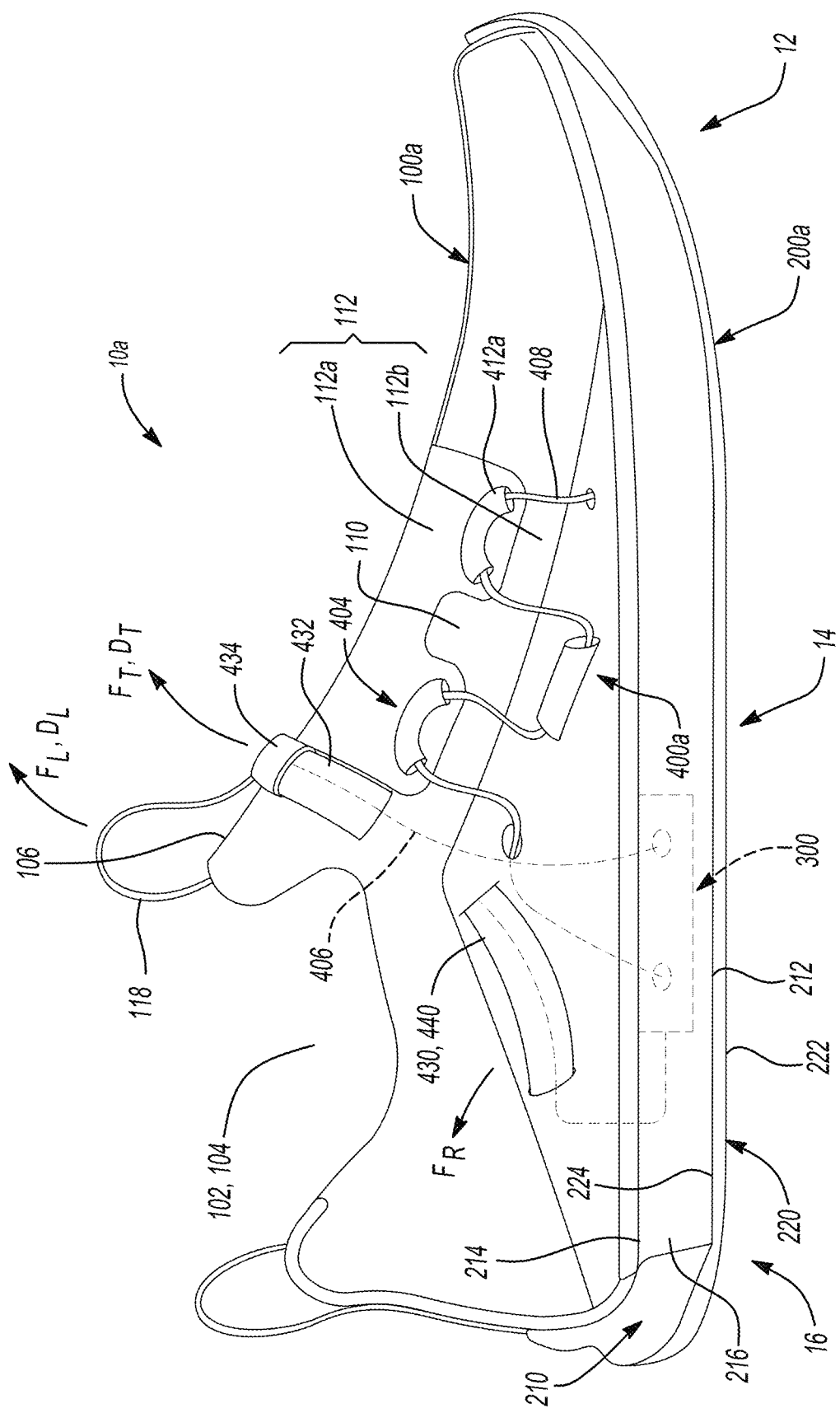
FIG. 4 is an alternate view of the article of footwear of FIG. 1 showing a loosening grip operable to transition the locking device from the locked state to the unlocked state substantially aligned with a control portion operable to move the upper from a loosened state to a tightened state.

While the cable guides 412 are shown and described as being open and as having C-shapes, one or more of the cable guides 412 could be formed from curved tubing such that the inner surface is defined by an inner surface of the curved tubing, as shown in the example of the article of footwear 10, 10a, in FIG. 4. In such a configuration, the tubing could be formed at the same or similar radius as the flange 418.

As provided above, tubing of the cable guides 412 may be formed from a substantially rigid material and may define inner surfaces 420 that slidably receive the fastening portions 408a, 408b when the cable 402 moves between the tightening direction $D_T$ and the loosening direction $D_L$. Further, the tubes may not be fully enclosed, whereby the cable guides 412 only include walls at a location where the fastening portions 408a, 408b contact the cable guide 412. For example, the flange 418 of the cable guides 412 may be open in a direction facing away from elastic region 110 and closed at a side (i.e., the side in contact with the cable 402) opposing the elastic region 110.

In some examples, the inner (cable contacting) surfaces 420 of the cable guides 412 are lined or coated with a low friction material, such as a lubricous polymer (e.g., high density polyethylene, fluoropolymers such as Teflon™, polytetrafluoroethylene-based and/or perfluoroalkoxy-based polymers, fluorinated ethylene propylene, etc.), that facilitates movement of the cable 402 therein. By coating portions of the cable guides with a low friction material, the number of turns taken by each lacing pattern can be increased. For instance, the cable guides 412 provide five (5) turns of the cable 402 on each of the lateral side 18 and medial side 20 without friction detrimentally inhibiting movement by the cable 402 in the tightening direction $D_T$. In other examples, the cable guides 412 include apertures (e.g., eyelets) formed through the inelastic regions 112a, 112b of the upper 100, or fabric or mesh loops attached to the inelastic regions 112a, 112b of the upper 100 to receive the fastening portions 408a, 408b. Fabric or mesh loops/webbing may generate more friction with the cable 402 when the cable 402 moves in the tightening direction $D_T$ compared to that of a cable guide lined with the low friction material. Accordingly, the maximum number of fabric or mesh loops for use as the cable guides 412 may be limited to not exceed a threshold number of turns of the cable 402 so that friction does not detrimentally inhibit movement by the cable 402 in the tightening direction $D_T$.

With continued reference to FIGS. 1 and 2, the lateral fastening portion 408a and the medial fastening portion 408b route through corresponding ones of the cable guides 412 disposed along the throat closure 116 of the upper 100. After routing through the cable guides, the terminal ends 409a, 409b of the lateral fastening portion 408a and the medial fastening portion 408b may operatively connect to one another along the bottom surface of the strobel 218 at a location proximate to the forefoot region 12, as shown in FIG. 3. For instance, a connector 424 may connect the terminal ends 409a, 409b to one another or the terminal ends 409a, 409b may be knotted together, adhesively bonded to each other, or melded together. In other configurations, the terminal ends 409a, 409b of the fastening portion 408 secure to the upper 100 at separate locations proximate to a distal end of the throat closure 116.

With reference to FIGS. 1 and 2, each of the lateral side 18 and the medial side 20 of the upper 100 include a set of upper cable guides 412a disposed upon the upper inelastic regions 112a and a set of lower cable guides 412b opposing the set of upper cable guides 412a and disposed upon the lower inelastic regions 112b. Accordingly, the elastic regions 110 are disposed between the upper cable guides 412a and the lower cable guides 412b. The example of FIG. 1 shows the upper cable guides 412a and the lower cable guides 412b including individual sections of tube each having a corresponding inlet for receiving one of the terminal ends 409a, 409b of the fastening portions 408a, 408b from across the elastic region 110 and a corresponding outlet for directing the terminal ends 409a, 409b back across the elastic region 110. In some examples, each cable guide 412 is associated with a section of tubing bent at substantially ninety-degrees (90°) through a continuous curvature and attached to the upper and lower inelastic regions 112a, 112b. For instance, the tubing associated with the cable guide 412 may be sewn or adhesively bonded to the inelastic region 112 or to an intermediary material attached to the inelastic region 112. While the example shows the cable guides 412 on each of the lateral side 18 and the medial side 20 including three upper cable guides 412a and two lower cable guides 412b, other configurations may include each set including a greater or lesser number of cable guides 412a, 412b. In some examples, the lower cable guides 412b include a greater number of cable guides 412 than the upper cable guides 412a. In yet another example, the upper and lower cable guides 412a, 412b each include the same number of cable guides 412.

The number of upper and lower cable guides 412a, 412b may be optimized to reduce friction when the cable 402 moves in the tightening direction $D_T$. Moreover, the placement of the upper and lower cable guides 412a, 412b upon the upper 100 may be selected so that each section of the cable 402 extending between each corresponding pair of upper and lower cable guides 412a, 412b is substantially straight to reduce friction when the cable moves in the tightening and loosening directions $D_T$, $D_L$. In some implementations, to provide an equal distribution of tightening as the upper 100 moves into the tightened state, the number of upper cable guides 412a on the lateral side 18 is equal to the number of upper cable guides 412a on the medial side 20, and the number of lower cable guides 412b on the lateral side 18 is equal to the number of lower cable guides 412b on the medial side 20.

In some implementations, one or more routing tubes 426 are configured to receive portions of the cable 402 for routing the control portion 406 and the fastening portion 408 through and along the footwear 10. Each of routing tubes 426 may include an inner diameter that is greater than an outer diameter of the received portion of the cable 402. In some examples, the routing tubes 426 facilitate movement of the control portion 406 and the fastening portion 408 relative to the upper 100 when the cable 402 is moved in the tightening direction $D_T$ and the loosening directions $D_L$.

With reference to FIGS. 1 and 2, a first routing tube 426a may receive and route a portion of the lateral fastening portion 408a extending from the locking device 300 and a second routing tube 426b may receive and route a portion of the medial fastening portion 408b through the midsole 210 and the upper 100. Similarly, a third routing tube 426c may receive and route the lateral control portion 406a and a fourth routing tube 426d may receive and route the medial control portion 406b through the midsole 210 and along the upper 100. Moreover, a fifth routing tube 426e may receive and route a portion of the release cord 384 through the midsole 210 and the upper 100. While the examples show the tubes 426 all extending through passages formed through the upper 100 from the midfoot region 14 of the midsole 210 toward the throat closure 116 of the upper 100 or the ankle opening 104 of the upper 100 at the heel region 16, one or more of the tubes 426 may be disposed on an exterior surface of the upper 100 or disposed on an interior surface of the upper 100 within the interior void 102.

Figure 7:
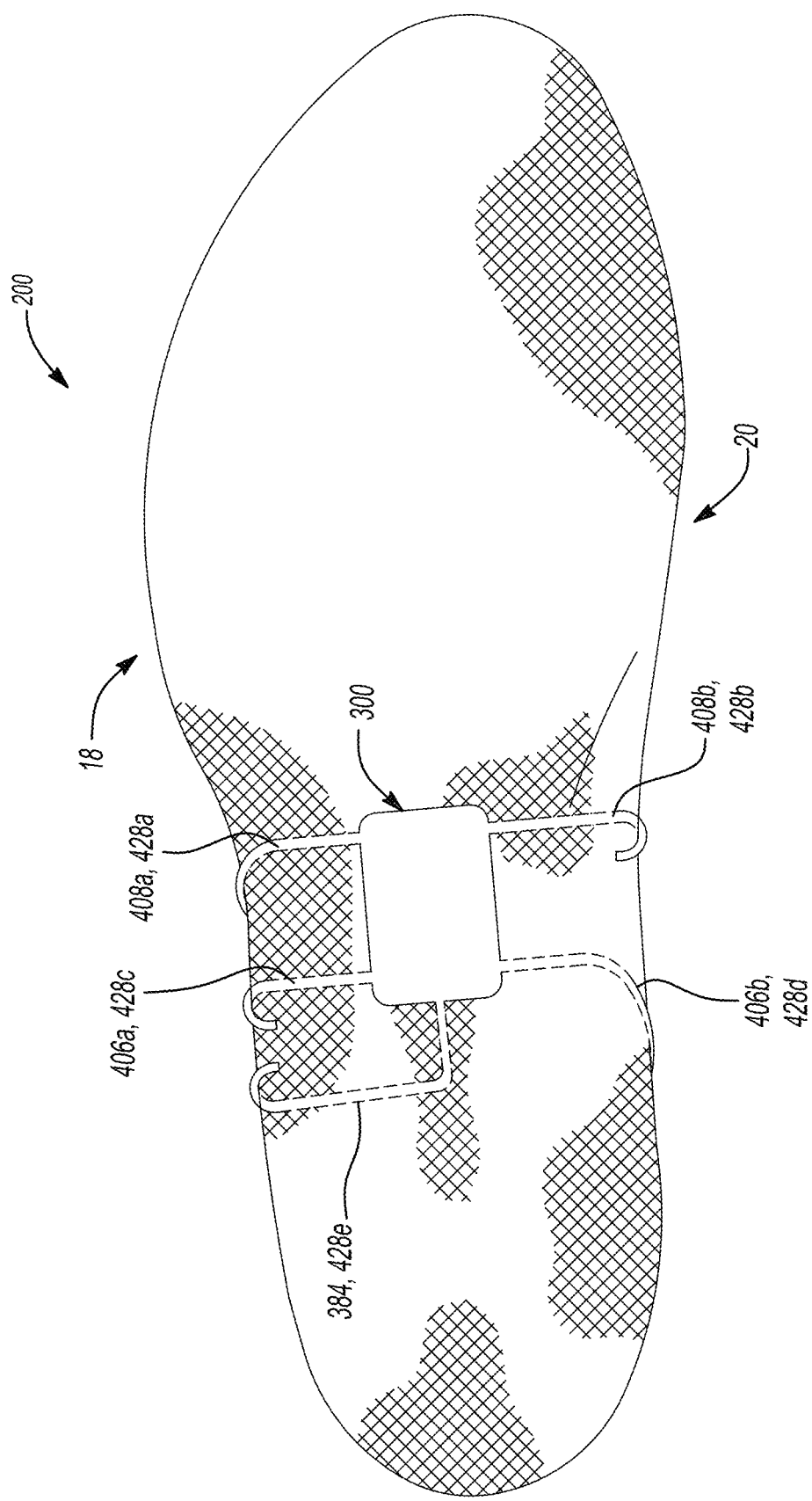
FIG. 7 is a bottom view of a midsole of the article of footwear of FIG. 1 showing a cavity and a plurality of passages formed through the midsole for receiving the locking device and routing tensioning cables through the midsole.

As shown in FIG. 7, the fastening system 400 includes a plurality of passages 428 formed in the sole structure 200. The passages 428 are configured to receive and route the ends of the cable 402 and the release cord 384 that extend out of the locking device 300 disposed in the midfoot region 14. Here, a first passage 428a may receive the end of lateral fastening segment 408a extending between the locking device 300 and the first routing tube 426a, and a second passage 428b may receive the end of the medial fastening portion 408b extending between the locking device 300 and the second routing tube 426b. In some implementations, the first passage 428a and corresponding first routing tube 426a each include a first portion extending from the locking device 300 toward the lateral side 18 of the midsole 210 to a bend section, and a second portion extending from the bend section toward the ankle opening 104 at the heel region 16. The second portion of the routing tube 426a may exit the passage 428a of the midsole 210 and extend along a portion of the lateral side 18 of the upper 100. Likewise, the second passage 428b and corresponding second routing tube 426b may each include a first portion extending from the locking device 300 toward the medial side 20 of the midsole 210 to a bend section and a second portion extending from the bend section toward the ankle opening 104 at the heel region 16. The second portion of the routing tube 426b may exit the passage 428b of the midsole 210 and extend along a portion of the medial side 20 of the upper 100. Accordingly, and with reference to FIGS. 1-3, the upper 100 includes additional routing features for the fastening portion 408 of the cable 402 to direct the lateral fastening portion 408a and the medial fastening portion 408b along corresponding ones of the lateral and medial sides 18, 20 of the upper 100 prior to routing through the corresponding lateral and medial cable guides 412 disposed along the lateral and medial sides 18, 20 of the throat closure 116.

With reference to FIGS. 1-3, third and fourth passages 428c, 428d are configured to receive and route ends of the lateral control portion 406a and the medial control portion 406b that extend out of the locking device 300. Here, the third passage 428c may receive portions of the third routing tube 426c having the lateral control portion 406a enclosed therein, and the fourth passage 428d may receive portions of the fourth routing tube 426d having the medial control portion 406b of the cable 402 enclosed therein. In some implementations, the third passage 428c and corresponding third routing tube 426c each include a first portion extending from the locking device 300 toward the lateral side 18 of the midsole 210 to a bend section and a second portion extending from the bend section toward a location proximate to where the throat closure 116 and the ankle opening 104 intersect. The second portion of the third routing tube 426c may exit the third passage 428c of the midsole 210 and extend along the lateral side 18 of the upper 100 in a direction away from the outsole 220. Likewise, the fourth passage 428d and corresponding fourth routing tube 426d may each include a first portion extending from the locking device 300 toward the medial side 20 of the midsole 210 to a bend section and a second portion extending from the bend section toward the location proximate to where the throat closure 116 and the ankle opening 104 intersect. The second portion of the fourth routing tube 426d may exit the fourth passage 428d of the midsole 210 and extend along the medial side 20 of the upper 100 in a direction away from the outsole 220.

With continued reference to FIGS. 3 and 7, release passage 428e is configured to receive and route portions of the release cord 384 that extends out of the first end 316 of locking device 300. Here, the release passage 428e may receive portions of a routing tube 426e having a portion of the release cord 384 enclosed therein. In some implementations, the release passage 428e includes a first portion extending from the locking device 300 toward the heel region 16 of the midsole 210 to a first bend section, a second portion extending from the first bend section toward the medial side 20 of the midsole 210 to a second bend section, and a third portion extending from the second bend section toward the location proximate to where the throat closure 116 and the ankle opening 104 intersect. The third portion of the fifth routing tube 426e may exit the release passage 428e of the midsole 210 and enter a corresponding passage formed through the upper 100 that extends along the medial side 20 of the upper 100 before exiting the passage and attaching to the upper 100 at second end to provide a release grip 430 that allows the user to apply the release force $F_R$ for transitioning the locking device 300 to the unlocked state, as indicated by the arrow in FIGS. 2 and 3.

Portions of the routing tubes 426 extending through the corresponding passages 428 formed in the midsole 210 may attach to surfaces of the strobel 218 at one or more locations and/or to opposing surfaces of the midsole 210. The routing tubes 426 may be formed from a substantially rigid material and may define interior walls configured to facilitate movement of the cable 402 in the tightening and loosening directions $D_T$, $D_L$. In some examples, the routing tubes 426 are lined or coated with a low friction material, such as a lubricous polymer (e.g., polytetrafluoroethylene), that facilitates the movement of the cable 402 therethrough.

As provided above, the control portion 406 of the cable 402 is a continuous loop extending from the first end 316 of the locking device 300. As shown in FIGS. 1-3, the control portion 406 extends around the tongue portion 106 proximate to where the ankle opening 104 and the throat closure 116 meet (i.e., proximate to an area above an instep of a wearer's foot). The portion of the control portion 406 that extends around the tongue portion 106 may be enclosed within a sheath 432. The sheath 432 may include an inner cavity or space having a larger cross-sectional area than an outer diameter of the cable 402 to accommodate bunching of the control portion 406.

The sheath 432 may additionally be formed from a material and/or a weave that allows the sheath 432 to move from a relaxed state to a stretched or expanded state when the control portion 406 is moved in a direction away from the upper 100 by way of the tightening force $F_T$ (i.e., when the cable 402 is moved in the tightening direction $D_T$). When the tightening force $F_T$ is removed, the material and/or weave of the sheath 432 automatically causes the sheath 432 to contract to the relaxed state and accommodate bunching by the control portion 406 therein.

In the example shown, a separate control portion grip 434 operatively connects to the sheath 432 at an attachment location proximate to the tongue portion 106 to allow a user to apply the tightening force $F_T$ to pull the control portion 406 away from the upper 100, and thereby constrict the elastic regions 110 by simultaneously drawing the upper and lower inelastic regions 112a, 112b toward one another to move the upper 100 into the tightened state. Other configurations may include operatively connecting the control portion grip 434 to other portions of the sheath 432 along the length of the control portion 406. In some implementations, the control portion grip 434 is omitted and the sheath 432 corresponds to the control portion 406 by allowing a user to grasp and apply the tightening force $F_T$ to pull the control portion 406 away from the upper 100.

With reference to FIGS. 1 and 2, the fastening system 400 may include a plurality of conduits 414 disposed on an outer surface of the upper 100 for routing the cable 402 between the sole structure 200 and the cable guides 412. For example, the lateral fastening portion 408a extends from the locking device 300 at the midfoot region 14 and along the lateral side 18 of the upper 100 to a first conduit 414a disposed proximate to the heel region 16. A second conduit 414b serves as an anchor point for the lateral fastening portion 408a to cause the lateral fastening portion 408a to extend in a direction proximate to the ankle opening 104 along the lateral side 18 of the upper 100 to a cable guide 412 disposed proximate to where the ankle opening 104 and the throat closure 116 meet. The lateral fastening portion 408a is then fed through a rear-most upper cable guide 412a, across the elastic region 110, and through a rear-most lower cable guide 412b. The lateral fastening portion 408a continues zigzagging across the elastic region 110 to sequentially feed through the upper and lower cable guides 412a, 412b before finally operatively connecting to the medial fastening portion 408b at the terminal ends 409a, 409b as shown in FIG. 3. As shown in FIG. 2, the medial fastening portion 408b is routed in a substantially similar manner along the medial side 20 of the article of footwear 10.

Referring to FIGS. 5 and 6, in some implementations, the lacing pattern associated with the lateral fastening portion 408a and the lacing pattern associated with the medial fastening portion 408b are selected so that a total closure between the upper inelastic region 112a and the lower inelastic region 112b on the lateral side 18 is approximately equal to a total closure distance between the upper inelastic region 112a and the lower inelastic region 112b of the medial side 20. FIG. 5 shows the upper 100 in the relaxed or loosened state, while FIG. 6 shows the upper 100 in the tightened state whereby the distances between the upper inelastic region 112a and the lower inelastic region 112b are reduced when the fastening portion 408 moves in the tightening direction $D_T$.

In some implementations, a take-up distance of the lateral fastening portion 408a is substantially equal to a take-up distance of the medial fastening portion 408b when the cable 402 moves in the tightening direction $D_T$. Accordingly, the take-up distance of the lateral fastening portion 408a is approximately equal to the reduction of width of the elastic region 110 on the lateral side 18, while the take-up distance of the medial fastening portion 408b is approximately equal to the reduction of width of the elastic region 110 on the medial side 20. Thus, the lacing patterns associated with the lateral and medial fastening portions 408a, 408b of the cable 402 may uniformly distribute tension across the throat closure 116 by constricting the elastic regions 110 when the locking device 300 transitions the upper 100 from the relaxed state, as indicated by first width W1 of the elastic regions 110 in FIG. 5, to the tightened state, as indicated by the reduced width W2 of the elastic regions 110 in FIG. 6.

Moreover, with continued reference to FIGS. 2 and 3 the upper 100 may define a passage along the medial side 20 for guiding portions of the release cord 384 that transitions the locking device 300 from the locked state to the unlocked state for permitting the cable 402 to move in both directions $D_T$, $D_L$. For instance, the release cord 384 may be pulled to transition the locking device 300 to the unlocked state and may extend from a first end attached to the locking device 300 to a second end exposed from the upper 100 to permit a user to grip and pull the release cord 384 for moving the locking device 300 from the locked state to the unlocked state. In some examples, the second end of the release cord 384 is provided with the loop and/or gripping feature 430 to allow a user to grip and pull the release cord 384 when it is desirable to move the locking device 300 into the unlocked state and/or release the locking device 300 from the unlocked state. The example footwear 100 shows the second end of the release cord 384 attached to, and enclosed within, a sheath 440 corresponding to a loosening grip 430 that allows a user to apply a release force $F_R$ (FIG. 3) to the sheath 440 and/or the release cord 384 to move the locking device 300 to the unlocked state by moving the release cord 384 in a direction away from the upper 100. The sheath 440 may include a fabric material attached to the exterior surface of the upper 100 to define a sleeve or passage for guiding and enclosing portions of the release cord 384 that extend out of the midsole 210 and operably connect the release cord 384 at the second end. The sleeve or passage defined by the sheath 440 may accommodate bunching by the release cord 384 after the release force $F_R$ is applied, similar to the bunching described above with respect to the accumulator 411 of the control portion 406. In other examples, the second end of the release cord 384 can be disposed proximate to other regions of the footwear 10 such as at or near the tongue portion 106, the lateral side 18 of the upper 100, or the heel region 16 the upper 100.

FIG. 4 shows a perspective view of an alternative configuration of the footwear 10, 10a showing the release cord 384 extending out of a passage along the medial side 20 of the upper 100, 100a and the control portion 406 extending into a corresponding passage defined by the upper 100a to provide the appearance that the control portion 406 and the release cord 384 correspond to the same cable/cord. Here, the exposed portion of the control portion 406 extending around the tongue portion 106 is substantially aligned with the exposed portion of the release cord 384. The control portion may be enclosed within the sheath 432 and may optionally include the control portion 406 for allowing the user to apply the tightening force $F_T$, and the release cord 384 may be enclosed within the sheath 440 and have the second end attached to the upper 100a to provide the release grip 430 that allows the user to apply the release force $F_R$ for moving the locking device 300 from the locked state to the unlocked state. The sheaths 432, 440 may define a substantially equal thickness and a substantially equal width. Thus, in addition to forming the release grip 430, attaching the second end of the release cord 384 to the upper 100 at the attachment location along the medial side 20 gives the perception that the two sheaths 432, 440 are both routing exposed portions of the same cable/cord, despite the fact that the release cord 384 and the control portion 406 move independently from one another. While not shown in the alternative configuration, the first end of the release cord 384 attaches to the locking device 300.

As discussed above with respect to FIGS. 10 and 11, the locking device 300 is operable between a locked state restricting movement of the cable 402 in the loosening direction $D_L$ and an unlocked state permitting movement of the cable 402 in both the loosening direction $D_L$ and the tightening direction $D_T$. In some implementations, the locking device 300 permits movement of the cable 402 in the tightening direction $D_T$ when the locking device 300 is in the locked state. This arrangement allows the cable 402 to move in the tightening direction $D_T$ each time the tightening force $F_T$ is applied to the control portion 406 while restricting movement in either the tightening direction $D_T$ or the loosening direction $D_L$ when the tightening force $F_T$ is released. In doing so, the interior void 102 can be incrementally tightened around the foot until a desired fit is achieved. In these implementations, the locking device 300 must transition from the locked state to the unlocked state to permit the cable 402 to move in the loosening direction $D_L$ when the loosening force $F_L$ is applied to the fastening portion 408. In other words, the cable 402 is restricted from moving in the loosening direction $D_L$ when the loosening force $F_L$ is applied to the fastening portion 408 unless the locking device 300 is in the unlocked state.

Referring to FIG. 1, the cable 402 is movable in the tightening direction $D_T$ when a tightening force $F_T$ is applied to the control portion 406 to pull the control portion 406 away from the upper 100 to tighten the cable guides 412, and thereby move the upper 100 into the tightened state. For example, once a foot is received by the interior void 102 and supported upon the sole structure 200, the upper 100 may be automatically tightened to secure the fit of the interior void 102 around the foot by applying the tightening force $F_T$ to the control portion 406 without the need of having to manually tie shoe laces or manually fasten other fasteners to tighten the upper 100. Here, the movement of the cable 402 in the tightening direction $D_L$ causes an effective length of the control portion 406 to increase and an effective length of the fastening portion 408 to decrease. The decrease in the effective length of the fastening portion 408 is operative to cause the upper cable guides 412a to be pulled towards the lower cable guides 412b to cinch and tighten the upper 100 around the foot such that the foot is secured within the interior void 102 while supported upon the sole structure 200, as illustrated in FIGS. 5 and 6. Namely, decreasing the effective length of the fastening portion 408 exerts a tensioning force on the cable guides 412, thereby causing the cable guides 412 to be drawn towards each other and tighten the upper 100 around the foot, as the fastening portion 408 is attached to the cable guides 412.

In some examples, a desired fit of the interior void 102 around the foot is adjustable based upon a magnitude of the tightening force $F_T$ applied to the control portion 406. For instance, increasing the magnitude of the tightening force $F_T$ may move the cable 402 further in the tightening direction $D_T$ such that the tightening of the cable guides 412 along the upper 100 increases to achieve a tighter fit of the interior void 102 around the foot. Additionally or alternatively, the fit of the interior void 102 around the foot may be adjustable based upon a duration of the tightening force $F_T$ applied to the control portion 406. For instance, tightening forces $F_T$ applied to the control portion 406 for longer durations may result in the cable 402 moving a further distance in the tightening direction $D_T$ to achieve a tighter fit of the interior void 102 around the foot.

Referring to FIG. 1, the cable 402 is movable in the loosening direction $D_L$ when a loosening force $F_L$ is applied to the loosening grip 118 while the cable lock 300 is in the unlocked state. As discussed above, the cable lock 300 is moved to the unlocked state by applying a release force $F_R$ to the release cord 384 to move the locking member 308 away from the engagement surfaces 334.

In the illustrated example, the cable 402 may be indirectly caused to move in the loosening direction $D_L$ by pulling the loosening grip 118. For example, the when the loosening force $F_L$ is applied to the loosening grip 118, the tongue portion 106 is pulled in a direction away from the upper 100 to expand the interior cavity 102. As a result of the tongue portion 106 being pulled away from the upper 100, the upper cable guides 412a are pulled apart from the lower cable guides 412b, and the effective length of the fastening portion 408 is caused to increase. When the loosening force $F_L$ is released from the loosening grip 118, the upper 100 may move to a relaxed state, whereby the increased effective length of the fastening portion 408 allows the interior cavity 102 to be expanded for donning or doffing of the footwear 10. In other examples, the loosening force $F_L$ may be applied directly to the fastening portion 408 to increase the effective length of the fastening portion 408. For example, the fastening portion 408 may include one or more pull tabs that can be grasped by the user for applying the loosening force $F_L$.

Accordingly, the footwear 10 may be donned and doffed without having to untie shoe laces or unfasten one or more fasteners to loosen the upper 100. Particularly, as the cable 402 moves in the loosening direction $D_L$, an effective length of the fastening portion 408 of the cable 402 is increased as the effective length of the control portion 406 is decreased. Here, the increase to the effective length of the fastening portion 408 allows the upper cable guides 412a to move away from the lower cable guides 412b to facilitate a transition of the upper 100 from the tightened state to the loosened state such that the foot can be removed from the interior void 102 through the ankle opening 104.

As the cable 402 is pulled through the locking device in one of the tightening direction $D_T$ and the loosening direction $D_L$, the cable 402 engages the grooves 398 of the respective pulleys 310 and causes each of the pulleys 310 to rotate about the shafts 336 of the housing 304. As the pulleys 310 rotate, the distal ends 348 of the prongs 344 are intermittently engaged by the lower protrusions 396b of the pulley 310. As provided above, each of the lower protrusions 396b extends the same length L2 around the outer wall 392 of the pulley 310 and are regularly spaced from each other by a distance D2. Accordingly, the intermittent engagement of the distal ends 348 of the prongs 344 with the protrusions 396b corresponds to movement of the cable 402 by an increment corresponding to the sum of the distance D2 between protrusions 396b and the lengths L2 of the lower protrusions 396b. For example, when the cable 402 is pulled in the tightening direction $D_T$ a distance equal to the sum D2 and L2, the pulley 310 will rotate an amount equal to one increment. Each increment will be indicated by the intermittent engagement between the distal end 348 of the prong 344 and the lower protrusions 396b in the form of an audible feedback and/or a tactile feedback. For example, as the protrusion 396b engages the distal end 348 of the prong 344, a click noise may be generated to indicate to the user that the cable 402 is moving through the locking device 300. Similarly, the engagement of the distal end 348 of the prong 344 with the pulley 310 may be felt by the user in the form of a tactile feedback, as a resistance to movement in the tightening direction $D_T$ may be intermittently provided.

Figure 16:
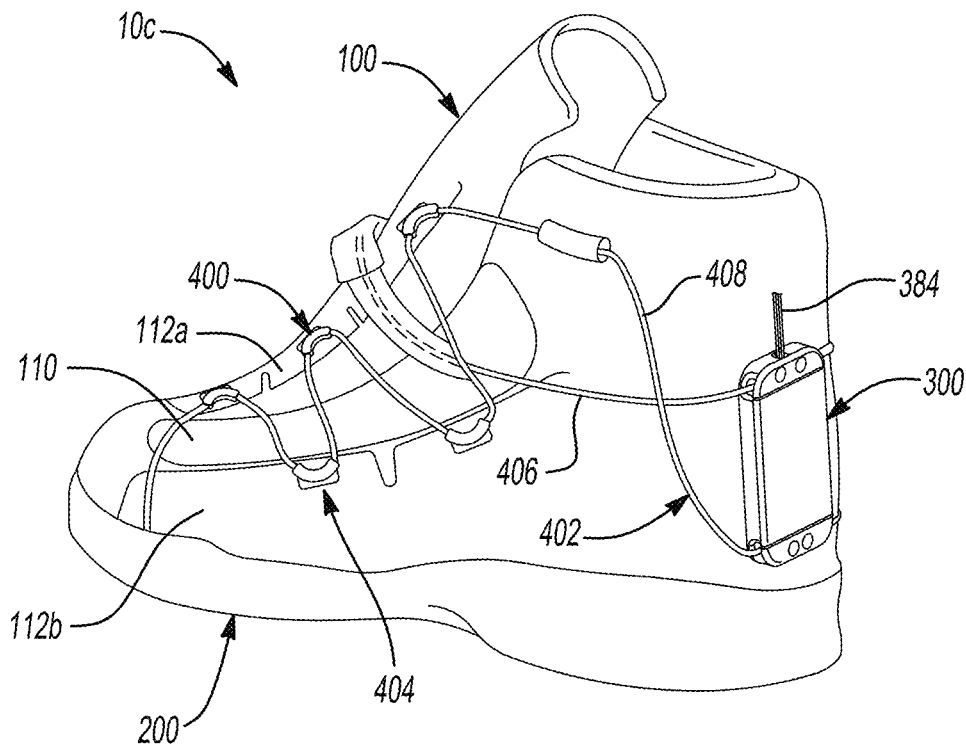
FIG. 16 is a rear perspective view of an article of footwear incorporating the locking device of FIG. 8 at a posterior end of a heel region of the article of footwear.
Figure 17:
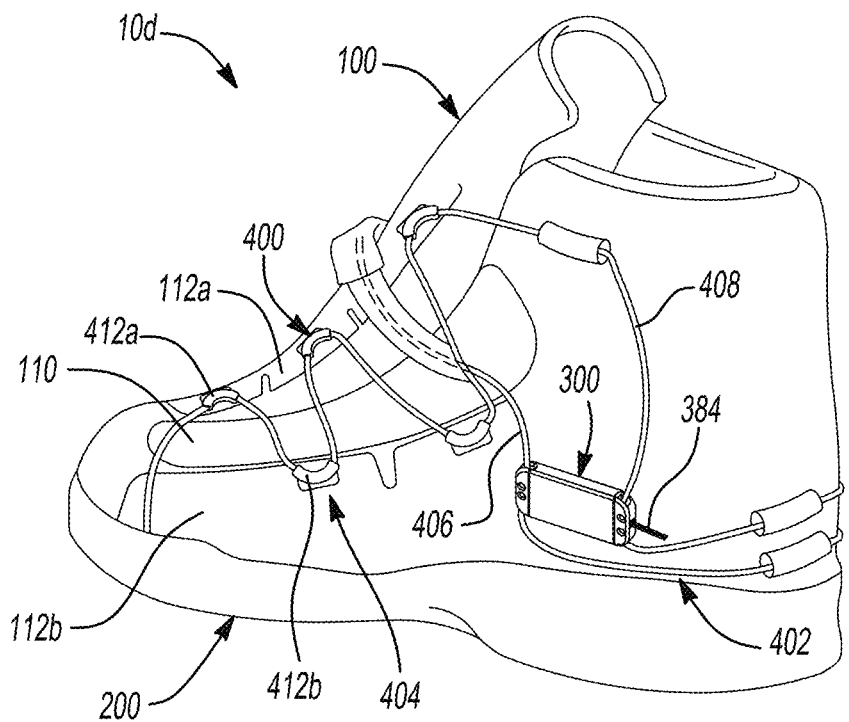
FIG. 17 is a rear perspective view of an article of footwear incorporating the locking device of FIG. 8 at a medial side, heel region of the article of footwear.
Figure 18:
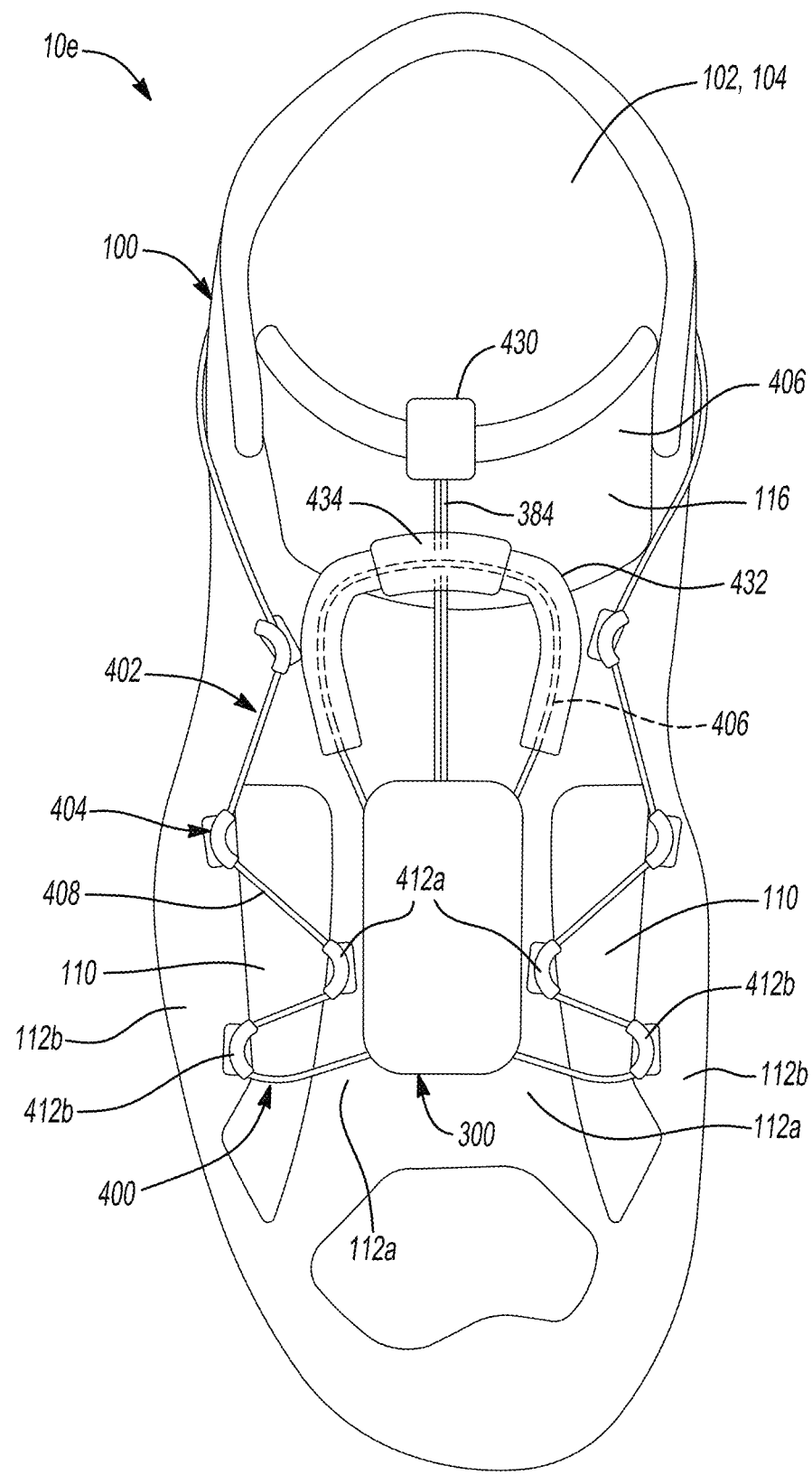
FIG. 18 is a top plan view of an article of footwear incorporating the locking device of FIG. 8 at vamp region of the article of footwear.

While the locking device 300 of FIGS. 1-18 is described as being disposed upon the bottom surface of the strobel 218 in the midfoot region 14 and encapsulated by the cavity of the midsole 210, the locking device 300 may be disposed at other locations without departing from the scope of the present disclosure. For instance, the location of the locking device 300 be under the foot and may shift from the midfoot region 14 to either one of the forefoot region 12 or the heel region 16. In other configurations, the locking device 300 may be disposed upon exterior surfaces of the upper 100 at any suitable location, such as along the heel region of the upper 100, as shown in FIGS. 16 and 17, or over the top of the foot (e.g., above the instep) on the upper 100 or the tongue portion 106 as shown in FIG. 18. In other configurations, the locking device 300 may be disposed within the interior void 102 of the upper 100 and between the inner surface of the strobel 218 and a drop-in midsole. The routing of the control portion 406, the control portion 406, and the release cord 384 may be adapted to accommodate a change in location for the locking device 300 so that the upper 100 may be moved between the loosened state and the tightened state. The passages enclosing the second end of the release cord 384 may be disposed at the lateral side 18 or the medial side 20 of the upper 100, or any other suitable location, when the locking device 300 is disposed on the upper 100 at the heel region 16.

The following Clauses provide exemplary configurations for an article of footwear and a cable lock in accordance with the principles of the present disclosure.

Clause 1: An article of footwear comprising an upper defining an interior void, a cable movable in a tightening direction to move the upper into a tightened state and movable in a loosening direction to move the upper into a loosened state, and a cable lock coupled with the article of footwear and including a housing and operable in a locked state to restrict movement of the cable in the loosening direction and operable in an unlocked state to permit movement of the cable in the loosening direction, the cable lock including a first pulley disposed within the housing and positioned to freely rotate in response to movement of the cable through the housing and along an outer circumferential portion of the first pulley.

Clause 2: The article of footwear of Clause 1, wherein the cable includes a control portion operable to be moved away from the upper in a first direction to move the cable in the tightening direction.

Clause 3: The article of footwear of Clause 2, wherein the cable lock is disposed remotely from the control portion.

Clause 4: The article of footwear of Clause 1, wherein the first pulley includes a plurality of protrusions extending from a rotational axis of the first pulley, the protrusions defining openings disposed between adjacent protrusions of the plurality of protrusions.

Clause 5: The article of footwear of Clause 4, wherein the first pulley defines a groove extending around an outer circumference of the first pulley, the groove operable to receive the cable therein.

Clause 6: The article of footwear of Clause 5, wherein the groove is defined between corresponding protrusions at each of a first side and an opposing second side of the first pulley.

Clause 7: The article of footwear of Clause 4, further comprising a prong coupled with the housing and having a first end operable to be intermittently engaged by the plurality of protrusions when the first pulley rotates.

Clause 8: The article of footwear of Clause 7, wherein the prong includes a second end attached to the housing, the first end moving relative to the second end when the first pulley rotates.

Clause 9: The article of footwear of Clause 8, wherein the prong is integrally formed with the housing.

Clause 10: The article of footwear of Clause 8, wherein the prong has a first length extending between the second end and the first end, the prong being flattened along a portion of the first length.

Clause 11: The article of footwear of Clause 1, wherein the cable lock includes a second pulley operable to provide at least one of audible feedback and tactile feedback when the cable is translated relative to and within the housing in the tightening direction, the second pulley engaging a different portion of the cable than the first pulley.

Clause 12: The article of footwear of Clause 11, wherein a biasing spring extends between the first pulley and the second pulley, a first end of the biasing spring being coupled with the housing and a second end of the biasing spring being coupled with a sliding lock member.

Clause 13: The article of footwear of Clause 11, wherein the housing is elongate and has a longitudinal midline, the first pulley is disposed on an opposing side of the longitudinal midline of the housing relative to the second pulley, and both of the first pulley and the second pulley are disposed adjacent a first end of the housing.

Clause 14: The article of footwear of Clause 1, wherein the housing has a first planar exterior surface and an opposing second planar exterior surface, a maximum thickness between the first planar exterior surface and the second planar exterior surface being within the range of 0.6 cm to 1.2 cm.

Clause 15: The article of footwear of Clause 1, wherein the housing is bilaterally symmetrical.

Clause 16: The article of footwear of Clause 1, wherein the housing is shaped as a rounded rectangle.

Clause 17: The article of footwear of Clause 16, further comprising an aperture located at each respective corner of the housing.

Clause 18: The article of footwear of Clause 17, wherein a portion of the cable extends through each aperture located at each respective corner of the housing.

Clause 19: The article of footwear of Clause 1, wherein the housing is rigid.

Clause 20: The article of footwear of Clause 1, wherein the housing further comprises one or more apertures located adjacent a peripheral edge of the housing and configured to receive insertion therethrough of a fastener.

Clause 21: The article of footwear of Clause 20, wherein the fastener is one or more selected from the group consisting of a thread, a filament, a strap, a rivet, a bolt, a screw, a hook, and a rod.

Clause 22: The article of footwear of Clause 1, wherein the cable changes direction as it extends around a portion of the first pulley and extends through an aperture in the housing, and wherein the change in direction is greater than 35 degrees and less than 120 degrees.

Clause 23: The article of footwear of Clause 1, further comprising a shaft extending from an inner surface of the housing, the first pulley being mounted on and rotatable about the shaft.

Clause 24: The article of footwear of Clause 1, wherein the cable, when under tension, extends from the first pulley at a tangent to the outer circumferential portion of the first pulley and through an aperture in the housing.

Clause 25: An article of footwear comprising an upper defining an interior void, a cable movable in a tightening direction to move the upper into a tightened state and movable in a loosening direction to move the upper into a loosened state, and a cable lock including a housing and operable in a locked state to restrict movement of the cable in the loosening direction and operable in an unlocked state to permit movement of the cable in the loosening direction, the cable lock including a first pulley and a second pulley that receive different portions of the cable and are operable to rotate relative to the housing when the cable is translated relative to and within the housing.

Clause 26: The article of footwear of Clause 25, wherein the cable includes a control portion operable to be moved away from the upper in a first direction to move the cable in the tightening direction.

Clause 27: The article of footwear of Clause 26, wherein the cable lock is disposed remotely from the control portion.

Clause 28: The article of footwear of Clause 25, wherein the first pulley and the second pulley are configured to provide an incremental feedback corresponding with movement of the cable by a first distance in the tightening direction.

Clause 29: The article of footwear of Clause 25, wherein at least one of the first pulley and the second pulley includes a plurality of protrusions extending from a rotational axis of the at least one of the first pulley and the second pulley, the protrusions defining openings disposed between adjacent protrusions of the plurality of protrusions.

Clause 30: The article of footwear of Clause 29, wherein the at least one of the first pulley and the second pulley defines a groove extending around an outer circumference of the at least one of the first pulley and the second pulley, the groove operable to receive the cable therein.

Clause 31: The article of footwear of Clause 29, further comprising a prong having a first end operable to be intermittently engaged by the plurality of protrusions when the cable is moved in the tightening direction.

Clause 32: The article of footwear of Clause 31, wherein the prong includes a second end attached to the housing, the first end moving relative to the second end when the cable is moved in the tightening direction.

Clause 33: The article of footwear of Clause 32, wherein the prong is integrally formed with the housing.

Clause 34: The article of footwear of Clause 25, wherein the first pulley and the second pulley are operable to provide at least one of audible feedback and tactile feedback when the cable is translated relative to and within the housing in the tightening direction.

Clause 35: A cable lock for a cable, the cable lock comprising a housing including a first end and a second end disposed on an opposite end of the housing than the first end, a first pulley rotatably supported by the housing and disposed proximate to one of the first end and the second end, the first pulley operable to freely rotate in response to movement of the cable through the housing and along an outer circumferential portion of the first pulley, a second pulley rotatably supported by the housing and disposed proximate to the one of the first end and the second end, the second pulley operable to freely rotate in response to movement of the cable through the housing and along an outer circumferential portion of the second pulley, and a lock member slidably disposed within the housing and movable between a locked state operable to restrict movement of the cable in a first direction relative to the housing and an unlocked state operable to permit movement of the cable in the first direction relative to the housing, the lock member being disposed closer to the other of the first end and the second end of the housing than the first pulley and the second pulley.

Clause 36: The cable lock of Clause 35, wherein the first pulley and the second pulley each includes a plurality of protrusions extending from a rotational axis of the first pulley and the second pulley, the protrusions defining openings disposed between adjacent protrusions of the plurality of protrusions.

Clause 37: The cable lock of Clause 36, wherein the first pulley defines a first groove extending around an outer circumference of the first pulley and the second pulley defines a second groove extending around an outer circumference of the second pulley, the first groove and the second groove operable to receive the cable therein.

Clause 38: The cable lock of Clause 37, wherein the first groove is defined between corresponding protrusions at each of a first side and an opposing second side of the first pulley and the second groove is defined between corresponding protrusions at each of a first side and an opposing second side of the second pulley.

Clause 39: The cable lock of Clause 36, further comprising a first prong coupled with the housing and having a first end operable to be intermittently engaged by the plurality of protrusions when the first pulley rotates a second prong coupled with the housing and having a first end operable to be intermittently engaged by the plurality of protrusions when the second pulley rotates.

Clause 40: The cable lock of Clause 39, wherein the first prong and the second prong each includes a second end attached to the housing, the first end moving relative to the second end when the first pulley and the second pulley rotate.

Clause 41: The cable lock of Clause 40, wherein the first prong and the second prong are integrally formed with the housing.

Clause 42: The cable lock of Clause 40, wherein the first prong and the second prong each has a first length extending between the second end and the first end, the first prong and the second prong being flattened along a portion of the first length.

Clause 43: The cable lock of Clause 35, wherein the first pulley and the second pulley are operable to provide at least one of audible feedback and tactile feedback when the cable is translated relative to and within the housing, the second pulley engaging a different portion of the cable than the first pulley.

Clause 44: The cable lock of Clause 35, wherein a biasing spring extends between the first pulley and the second pulley, a first end of the biasing spring being coupled with the housing and a second end of the biasing spring being coupled with a lock member.

Clause 45: The cable lock of Clause 35, wherein the housing is elongate and has a longitudinal midline and the first pulley is disposed on an opposing side of the longitudinal midline of the housing relative to the second pulley.

Clause 46: The cable lock of Clause 35, wherein the housing has a first planar exterior surface and an opposing second planar exterior surface, a maximum thickness between the first planar exterior surface and the second planar exterior surface being within the range of 0.6 cm to 1.2 cm.

Clause 47: The cable lock of Clause 35, wherein the housing is bilaterally symmetrical.

Clause 48: The cable lock of Clause 35, wherein the housing is shaped as a rounded rectangle.

Clause 49: The cable lock of Clause 48, further comprising an aperture located at each respective corner of the housing.

Clause 50: The cable lock of Clause 49, wherein a portion of the cable extends through each aperture located at each respective corner of the housing.

Clause 51: The cable lock of Clause 35, wherein the housing is rigid.

Clause 52: The cable lock of Clause 35, wherein the housing further comprises one or more apertures located adjacent a peripheral edge of the housing and configured to receive insertion therethrough of a fastener.

Clause 53: The cable lock of Clause 52, wherein the fastener is one or more selected from the group consisting of a thread, a filament, a strap, a rivet, a bolt, a screw, a hook, and a rod.

Clause 54: The cable lock of Clause 35, wherein the cable changes direction as it extends around a portion of the first pulley and extends through a first aperture in the housing and changes direction as it extends around a portion of the second pulley and extends through a second aperture in the housing, and wherein the change in direction is greater than 35 degrees and less than 120 degrees.

Clause 55: The cable lock of Clause 35, further comprising a first shaft extending from an inner surface of the housing and a second shaft extending from the inner surface of the housing, the first pulley being mounted on and rotatable about the first shaft and the second pulley being mounted on and rotatable about the second shaft.

Clause 56: The cable lock of Clause 35, wherein the cable, when under tension, extends from the first pulley at a tangent to the outer circumferential portion of the first pulley and through a first aperture in the housing and extends from the second pulley at a tangent to the outer circumferential portion of the second pulley and through a second aperture in the housing.

Clause 57: The cable lock of Clause 35, wherein the lock member includes a first lock surface and a second lock surface that converge toward one another, the first lock surface operable to pinch a first portion of the cable between a first engagement surface of the housing and the first lock surface in the locked state and the second lock surface operable to pinch a second portion of the cable between a second engagement surface of the housing and the second lock surface in the locked state to restrict movement of the cable in the first direction relative to the housing.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An article of footwear comprising:
   an upper defining an interior void;
   a cable movable in a tightening direction to move the upper into a tightened state and movable in a loosening direction to move the upper into a loosened state; and
   a cable lock coupled with the article of footwear and including a housing and operable in a locked state to restrict movement of the cable in the loosening direction and operable in an unlocked state to permit movement of the cable in the loosening direction, the cable lock including a first pulley disposed within the housing and positioned to freely rotate in response to movement of the cable through the housing and along an outer circumferential portion of the first pulley, the first pulley including a plurality of protrusion extending from a rotational axis of the first pulley and defining openings disposed between adjacent protrusions of the plurality of protrusions.

2. The article of footwear of claim 1, wherein the cable includes a control portion operable to be moved away from the upper in a first direction to move the cable in the tightening direction.

3. The article of footwear of claim 2, wherein the cable lock is disposed remotely from the control portion.

4. The article of footwear of claim 1, wherein the first pulley defines a groove extending around an outer circumference of the first pulley, the groove operable to receive the cable therein.

5. The article of footwear of claim 4, wherein the groove is defined between corresponding protrusions at each of a first side and an opposing second side of the first pulley.

6. The article of footwear of claim 1, further comprising a prong coupled with the housing and having a first end operable to be intermittently engaged by the plurality of protrusions when the first pulley rotates.

7. The article of footwear of claim 6, wherein the prong includes a second end attached to the housing, the first end moving relative to the second end when the first pulley rotates.

8. The article of footwear of claim 7, wherein the prong is integrally formed with the housing.

9. The article of footwear of claim 7, wherein the prong has a first length extending between the second end and the first end, the prong being flattened along a portion of the first length.

10. The article of footwear of claim 1, wherein the cable lock includes a second pulley operable to provide at least one of audible feedback and tactile feedback when the cable is translated relative to and within the housing in the tightening direction, the second pulley engaging a different portion of the cable than the first pulley.

11. An article of footwear comprising:
    an upper defining an interior void;
    a cable movable in a tightening direction to move the upper into a tightened state and movable in a loosening direction to move the upper into a loosened state; and
    a cable lock including a housing and operable in a locked state to restrict movement of the cable in the loosening direction and operable in an unlocked state to permit movement of the cable in the loosening direction, the cable lock including a first pulley and a second pulley that receive different portions of the cable and are operable to rotate relative to the housing when the cable is translated relative to and within the housing, at least one of the first pulley and the second pulley including a plurality of protrusions extending from a rotational axis of the at least one of the first pulley and the second pulley, the plurality of protrusions defining openings disposed between adjacent protrusions of the plurality of protrusions.

12. The article of footwear of claim 11, wherein the cable includes a control portion operable to be moved away from the upper in a first direction to move the cable in the tightening direction.

13. The article of footwear of claim 12, wherein the cable lock is disposed remotely from the control portion.

14. The article of footwear of claim 11, wherein the first pulley and the second pulley are configured to provide an incremental feedback corresponding with movement of the cable by a first distance in the tightening direction.

15. The article of footwear of claim 11, wherein the at least one of the first pulley and the second pulley defines a groove extending around an outer circumference of the at least one of the first pulley and the second pulley, the groove operable to receive the cable therein.

16. The article of footwear of claim 11, further comprising a prong having a first end operable to be intermittently engaged by the plurality of protrusions when the cable is moved in the tightening direction.

17. The article of footwear of claim 16, wherein the prong includes a second end attached to the housing, the first end moving relative to the second end when the cable is moved in the tightening direction.

18. The article of footwear of claim 17, wherein the prong is integrally formed with the housing.

19. The article of footwear of claim 11, wherein the first pulley and the second pulley are operable to provide at least one of audible feedback and tactile feedback when the cable is translated relative to and within the housing in the tightening direction.

* * * * *